US009715668B1

(12) United States Patent
Brandt et al.

(10) Patent No.: US 9,715,668 B1
(45) Date of Patent: Jul. 25, 2017

(54) PATROL PRESENCE MANAGEMENT SYSTEM

(71) Applicants: Christina M. P. Brandt, Santa Cruz, CA (US); Rogan Z. Griffin, Sandy, UT (US); Zachariah Friend, Aptos, CA (US)

(72) Inventors: Christina M. P. Brandt, Santa Cruz, CA (US); Rogan Z. Griffin, Sandy, UT (US); Zachariah Friend, Aptos, CA (US)

(73) Assignee: Predpol, Inc., Santa Cruz, CA (US)

( * ) Notice: Subject to any disclaimer, the term of this patent is extended or adjusted under 35 U.S.C. 154(b) by 0 days.

(21) Appl. No.: 15/098,051

(22) Filed: Apr. 13, 2016

Related U.S. Application Data

(60) Provisional application No. 62/148,023, filed on Apr. 15, 2015.

(51) Int. Cl.
G06Q 10/06 (2012.01)
G06N 5/02 (2006.01)

(52) U.S. Cl.
CPC ........... *G06Q 10/0631* (2013.01); *G06N 5/02* (2013.01)

(58) Field of Classification Search
CPC ..................................................... G06Q 10/06
See application file for complete search history.

(56) References Cited

U.S. PATENT DOCUMENTS

| 5,781,704 | A * | 7/1998 | Rossmo | G06Q 99/00 706/45 |
| 8,924,332 | B2 | 12/2014 | Maciejewski et al. | |
| 8,949,164 | B1 * | 2/2015 | Mohler | G06N 7/005 706/46 |
| 9,129,219 | B1 * | 9/2015 | Robertson | G06N 5/048 |
| 2011/0261067 | A1 * | 10/2011 | Trinko | G01C 21/3461 345/589 |
| 2012/0256745 | A1 * | 10/2012 | Piett | G06Q 30/02 340/540 |
| 2013/0039542 | A1 * | 2/2013 | Guzik | G11B 27/034 382/103 |
| 2015/0066557 | A1 * | 3/2015 | Lichti | H04W 4/028 705/7.15 |
| 2015/0066828 | A1 * | 3/2015 | Vepakomma | G06Q 10/04 706/46 |
| 2015/0073759 | A1 * | 3/2015 | Vepakomma | G06Q 50/265 703/6 |

(Continued)

OTHER PUBLICATIONS

Koper, Christopher S., Just Enough Police Presence: Reducing Crime and Disorderly Behavior by Optimizing Patrol Time in Crime Hot Spots, Justice Quarterly, vol. 12, No. 4, Dec. 1995.*

(Continued)

*Primary Examiner* — Kurtis Gills
(74) *Attorney, Agent, or Firm* — Advantage IP Law Firm

(57) ABSTRACT

A patrol presence management system having a dosage processing unit in communication with one or more prediction and dosage related data processing modules and an output device for monitoring, generating, and displaying a crime prediction field, a pre-determined dosage, and a current dosage to provide real-time or historical analysis of a police presence within a particular region within a particular time window for one or more crime types to improve policing strategy and tactics.

30 Claims, 9 Drawing Sheets

(56) References Cited

U.S. PATENT DOCUMENTS

2016/0031416 A1* 2/2016 Calhoun ............... H04W 4/22
701/483
2016/0148136 A1* 5/2016 Ni ................... G06Q 10/06316
705/7.22

OTHER PUBLICATIONS

Telep, Cody W. et al., How Much Time Should Police Spend at Crime Hot Spots? Answers from a Police Agency Directed Randomized Field Tiral in Sacramento, California, Justice Quartlery, vol. 31, No. 5, 2014.*

Examination of police dosage in residential buglarly and residential theft from vehicle mico-time hot spots Santos and Santos Crime Science, vol. 4, No. 27, 2015.*

Beck, Charlie, The Los Angeles Predictive Policing Experiment, 2013.*

Hot-Spot Policing, International Association of Criminal Analysts IACA Crime Analyst's Research Digest, Mar. 2012.*

Hoelzer, Gary, Common Patrol Areas: Hot Spots Policing Law & Order, vol. 59, No. 2, Feb. 2011.*

Ariel, Barak et al., The Bringham Hot Spot Experiment—Operation Savvy $7^{th}$ International Conference on Evidence Based Policing, Jul. 2014.*

Mohler, G.O. et al., Randomized Controlled Field Trials of Predictive Policing Journal of American Statistical Association, vol. 110, No. 512, 2015.*

PredPol.com Web Pages Feb. 2015, Retrieved from Archive.org Aug. 24, 2016.*

Abstract from Just Enough Police Presence: Reducing Crime . . . , Published Dec. 1995 in Justice Quarterly vol. 12, Issue 4, Author: C.S. Koper.

Self-Exciting Point Process Modeling of Crime, published Mar. 2011 in the Journal of the American Statistical Association, vol. 106, No. 493.

Marked point process hotspot maps for homicide and gun crime prediction in Chicago, published 2014 in the International Journal of Forecasting No. 30.

* cited by examiner

PATROL PRESENCE MANAGEMENT SYSTEM

CROSS-REFERENCE TO OTHER APPLICATIONS

This application claims the benefit of U.S. Application No. 62/148,023, filed on Apr. 15, 2015, entitled the same, and which is hereby incorporated by reference in its entirety.

BACKGROUND OF THE INVENTION

1. Field of the Invention

The present invention relates to activity monitoring systems, and more specifically, to systems and methods for managing police resources within specified geographic regions which may include high probability crime areas.

2. Background Art

Police departments nationwide continue to face budget freezes and deep cuts, requiring them to manage their resources more effectively while still responding to public demand for crime prevention and reduction. Because of this, there has been a more recent emphasis on attempting to predict crime before it occurs so as to focus precious resources in higher crime risk areas to maximize the potential of the public safety force.

Examples of more basic crime prediction or forecasting techniques include: crime counts, pin maps depicting past crime locations, and crime hotspot maps as some of the proposed methods of managing and allocating police resources. In dealing with crime data, crime hotspot maps are the most widely used tool for the quantification of future crime risk and are a key element in hotspot policing. However, these methods have generally proven unsatisfactory because they fail to take into account both long-term spatial variations in risk as well as short term elevation in risk following crime in a systematic way.

One such effort at a more advanced level of crime data analysis may be found in a software application named Crimestat. However, this software does not predict near-repeat patterns and is relatively cumbersome to use with an intensive learning curve since it requires expertise in GIS and additional software such as Arc GIS.

Another more recent solution that does take into account both long-term spatial variation in risk as well as short term elevation in risk following a crime may be found in U.S. Pat. No. 8,949,164 to Mohler (the '164 patent to Mohler), which is incorporated by reference. In general, the event forecasting system disclosed in the '164 patent to Mohler provides a predictive policing system that provides targeted, real-time, crime prediction forecasts that may take into account both spontaneous and triggered events. The results are presented in a user friendly format for patrol officers and shift commanders to better manage limited patrol resources. In addition to taking into account these long-term spatial variations and short term elevation in risk, the Mohler patent uses a more sophisticated computer model to assign probabilities to space time regions for the purpose of allocating police patrols. This approach further provides a dynamic element to crime prediction to get out ahead of predicted crime hotspots instead of merely chasing all crime as it appears. This approach further aids law enforcement so that the patrol officers avoid the drawback of chasing many single-event crimes that are not part of an emerging crime pattern.

One feature of the '164 patent to Mohler is the visual presentation of one or more high probability crime locations in the form of a geographic outline over a sub-region of a map element. This geographic region or hotspot can be as small as a parking space, house, or other single location or range much larger in size. When officers determine their location is within the outline, they understand they are in a high probability crime region. The underlying map with street names and intersections assists the officers with finding their way into the region. The officer's current location may also be shown on the map element as determined by a GPS unit associated with the officer. This visual presentation further aids the officer in determining if they are in the high probability crime region. Locating the patrol units within the hotspots supports the prime directive to provide a police presence within the high probability crime region. Once the hotspot is known, police protocol generally determines the recommended amount of time the officers should spend within the hotspot. However, there is no indicator for measuring the amount of time, either individually or collectively, that a patrol spends within the hotspot. This is important as more instances of police presence, also known as dosage, generally provide stronger residual effects on crime.

In reviewing the impacts of police presence, recent studies indicate that there may also be a point of diminishing returns relative to the amount of dosage or police presence. Thus, it would certainly be advantageous to provide an indication of the amount of police presence within certain regions, particularly high probability crime regions or other selected space, during selected time intervals. Furthermore, such indicators relative to known, calculated, or estimated dosages would further be beneficial in terms of patrol management, including the allowance for threshold variations from location to location. In addition to patrol presence, this activity monitoring and management feature may be applied to other scenarios as well that would benefit from knowing the whereabouts and presence (or lack of) of units or resources relative to a time-space grid.

Thus, there exists a need for an improved activity monitoring and resource management tool that better facilitates the determination of and feedback relating to dosage and related data.

SUMMARY OF THE INVENTION

In accordance with the principles of the present invention, a patrol presence management system may be provided with an output device and one or more modules for generating a crime prediction field or crime grid defining one or more hotspots associated with a region of interest and a time window with the hotspots generally being derived from a plurality of crime events occurring within the region of interest, the modules further being configured to generate dosage thresholds for the hotspots and acquire and aggregate instances of actual dosage where the modules may be accessed by a dosage processing unit to transmit a crime prediction field along the current dosage for at least one hotspot to the output device for graphical presentation.

In another aspect of this system, the time interval or time window may be selected from one of a minute, an hour, a day, a time of day, a week, a month, a year, or year to date.

In yet another aspect of the system, the source identifier may be selected from one of a GPS unit, an AVL unit or from a manual entry.

Another aspect of the system allows for a GPS unit, AVL unit, or a manual entry to be associated with a car, a radio, or a person with a mobile application when providing the input to the processing server or unit.

The patrol presence management system also contemplates that the pre-determined dosage information derives at least one maximum allowable dosage for one or more hotspots by crime type.

In another embodiment, one or more hotspot dosage indicators may be graphically represented by a boundary size relative to the current dosage and/or a stationary indicator associated with a source identifier.

In yet another embodiment, the output device may be configured to display a dosage threshold indicator and a current dosage indicator relative to the dosage threshold indicator.

In another embodiment, a dosage threshold indicator may include a first threshold region representing a dosage below a first pre-determined threshold, a second threshold region representing a dosage above a second pre-determined threshold, and an in range threshold region representing a dosage falling within the first and second pre-determined thresholds.

A non-transitory, computer-readable medium with computer readable instructions stored thereon to be executed by a processing device to perform dosage value operations in response to receiving input including a region of interest, at least one crime type, and at least one time window to provide dosage related information to a display device is also disclosed herein.

Methods for managing a patrol presence are also disclosed herein.

All of the embodiments summarized above are intended to be within the scope of the invention herein disclosed. However, despite the discussion of certain embodiments herein, only the appended claims (and not the present summary) are intended to define the invention. The summarized embodiments, and other embodiments and aspects of the present invention, will become readily apparent to those skilled in the art from the following detailed description of the preferred embodiments having reference to the attached figures, the invention not being limited to any particular embodiment(s) disclosed.

DETAILED DESCRIPTION OF THE PREFERRED EMBODIMENTS

System Architecture

Figure 1:
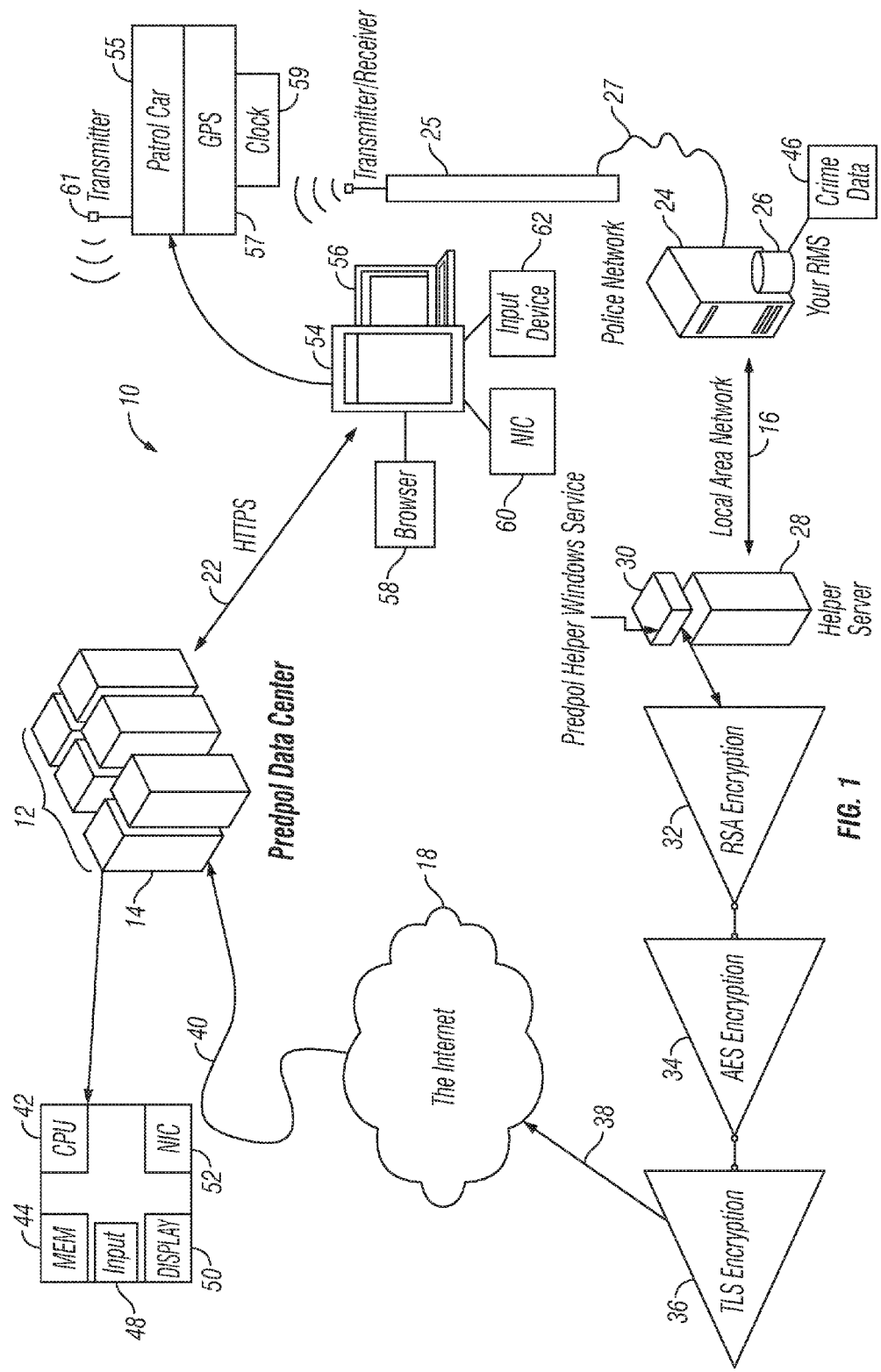
FIG. 1 is a schematic diagram of an exemplary system architecture for an embodiment of a patrol presence management system in accordance with the principles of the present invention.

With reference to the figures, exemplary embodiments of a patrol presence (or dosage) management system, generally designated 10 (FIGS. 1-3), are described herein. In general terms, the patrol presence management system provides a tool for managing the amount of police presence within a geographic region over a time interval or time window as an accumulation of specific time elements or time slices wherein instances of police presence, also referred to as dosage, are measured and tallied and then provided along with a threshold indicator for managing the dosage. For optimum performance, the patrol presence management system 10 may combine a predictive crime function with the dosage measurement tool resulting in a visual display overview to provide a patrol presence management tool that facilitates the management of patrols within selected geographic regions such as high probability crime areas. It will be appreciated that such system is quite useful when used in conjunction with a crime prediction system, such as that exemplified in U.S. Pat. No. 8,949,164 to Mohler, as well as other crime prediction systems. However, it will also be appreciated that the predictive crime function is optional and the patrol presence management system will also add value when used with a simple geographical region display (e.g. a map) having a selected region of concern where patrol management is to be applied. In addition, additional useful resource management details may also be accessed through a series of convenient and easy to use user interfaces. It will further be appreciated that dosage is generally defined as the amount of some function to happen within a given period (or amount) within a certain boundary. While the current embodiment as described below generally refers to dosage in the context of measuring policing patrol presence through monitoring GPS signals within a given geographic region during a particular time interval, other applications are contemplated as well as may apply to the realm of insurance, insurance fraud, drug enforcement, trafficking, gang activity, military exercises, hunting, bug control and other contexts where dosage tracking plays a role.

The patrol presence management system 10 is preferably offered as a Software as a Service (SaaS) type of product (or network portal) available over the internet or other large network portal using secure access protocols to make the information available immediately when and where it is needed, particularly prior to a patrol shift for tactical planning purposes and out in the field for real-time tactical adjustments. In addition to resident desktop software, client-server based models, or peer to peer versions, a mobile app version loaded into a mobile device or vehicle is a suitable alternative embodiment as well. Regardless of the supporting architecture, a user friendly interface is emphasized to encourage its use and bring newer police officers or patrol officers up to speed more quickly. It will also be appreciated that the patrol presence management system 10 is further designed to enhance and supplement patrol veterans' intuition and experience by providing an additional level of detail regarding dosage for a particular geographic region in which they likely patrol or may patrol. It will be appreciated that the patrol presence management system 10 may be used with or without a prediction field generator as described herein and in U.S. Pat. No. 8,949,164 to Mohler, which is incorporated by reference herein in its entirety. In this initial embodiment, it is presumed that system architecture supporting a prediction field generator is incorporated into the system 10.

Referring now to FIG. 1, the patrol presence management system 10 may be managed through a data center or secure location 12 that may include at least one predictive server 14. The predictive server 14 may be placed in communication with a police network 16 over the internet 18, either directly or indirectly, and also to one or more user devices 54 over a secure connection 22 via the internet or other suitable line of communication. The police network 16 may include one or more clients 24 and includes a record management system (or database) 26 containing historical crime data 46, typically crime events consisting of a crime type, crime location, and time of occurrence, and for storing additional dosage related information as described below. The database 46 may also be in communication with the predictive server 14, either directly or indirectly. The police clients may be relatively simple computers or terminals with the capability of transmitting the crime data over the internet 18 to the data center 12. The police clients 24 further include a transmitter/receiver 25 in communication with the police client over communication line 27 (wired and/or wireless) with the transmitter/receiver being capable of communicating with patrol units 55 in the field.

Still referring to FIG. 1, the local area police network 16 may be placed in communication with a helper server 28 loaded with a Windows Service 30 that may be used to encrypt the crime data 46 transmitted from the police station clients 24 to the predictive server 14 over the network 18. In this exemplary embodiment, the Windows Service 30 passes the crime data through a first RSA filter (module, tier, layer, device, algorithm, or function) 32, an AES filter 34, and a TLS encryption module 36 before passing over a communication line 38 to the internet 18 where the secure crime data 46 may then be forwarded on or received by the data center predictive server 14 over another communication line 40. It will be appreciated that the helper server and related Windows Service are optional features and merely provided to assist in the data flow through the data pipe of the system. Other suitable encryption modes may be used as well.

The helper windows service 30 initially processes the crime data received from the police client 24 through the RSA Encryption module 32. RSA is an algorithm for public-key cryptography. After passing through the RSA encryption module 32, the data is next transferred to an Advanced Encryption Standard (AES) process 34. The AES is a well-known algorithm in the form of a block cipher ratified as a standard by National Institute of Standards and Technology of the United States (NIST).

With continued reference to FIG. 1, once the crime data 46 is filtered through the AES Encryption module 34, the crime data is then processed through the Transport Layer Security (TLS) module 36, an advanced form of Secure Sockets Layer (SSL) encryption device that provides a first security communication protocol for securing communication over applications such as web browsing, electronic mail, Internet faxing, instant messaging and voice over-IP (VoIP) over the network 18 via secure line 38. The TLS protocol allows client-server applications to communicate across a network in a way designed to prevent eavesdropping and tampering. All three encryption modules 32, 34, and 36 (devices, algorithms) are well known in the art and may be used to secure both one-way or two-way communication between the client computers 24 and the data center 12 and the data center's predictive policing server 14. On the other hand, if the data being handled is not sensitive or confidential, then security related features like encryption and secure connections may be omitted if desired.

Still referring to FIG. 1, an exemplary predictive server (or processing device or computational device or prediction field generator) 14 includes a processing unit 42, a memory unit 44, an input device 48, a monitor or display screen 50, and a network interface connection 52. A suitable processing device has been found to be a server available from Rackspace, a company renting server space or virtual server space that enables a client to run data in isolated sections, slices, or areas of the server. In this exemplary embodiment, each server includes 30 GB RAM. The server may further be divided into dedicated slices of about $1/64$ capacity per police station associated with 20 GB of disk space for storage. Although not required, it is preferred to isolate the slices to add another layer of security to the process so that each police station or agency is maintained separately. Such exemplary processing device is not meant to be limiting and other suitable servers and processing devices will occur to those of ordinary skill in the art, including those available from companies such as GOOGLE, MICROSOFT, INTEL, IBM, AMAZON, or other provider as well as one or more dedicated servers behind firewalls.

At the other end of the patrol presence management system 10 communication network from the police client 24 are one or more user devices 54 that include their own display screen 56 and are loaded with a web browser 58 or other means to communicate with remote data and includes a network interface 60 and input device 62. The user device 54 and input device 62 may include a patrol unit's vehicle 55 (or suitable handheld device) which includes a GPS unit 57 with a unique ID 67 and with a clock 59 and a transmitter 61 for communicating with the transmitter/receiver 25 of the police client 24. It will be understood that such GPS unit includes any device capable or constructed to transmit a geo-location (or spatial) coordinates or other location data wherein a remote user may determine the location of the GPS unit relative to a corresponding mapping element constructed in accordance with such coordinates. While such GPS unit preferably includes a clock element providing a time stamp (time element, time instance, or time slice) associated with a reading of the location coordinates, it is also feasible that a remote user may take time measurements based on receipt of the location coordinates. In other words, the GPS unit may provide location coordinates along with a time stamp or the GPS unit may transmit location coordinates to a remote user who may record the time the location coordinates are received by viewing a time keeping device at their end. It will be appreciated that the user device 54 may be a desktop or laptop computer, smartphone, PDA, tablet, in vehicle onscreen display, smart watch, handheld device, headset, satellite phone, satellite or other remote tracking, GPS device, walkie-talkie, or other mobile device and that may include a browser, resident software, a mobile app, a network interface device, and an input device for browsing over the internet to request data from the prediction server 14 and communicating with the predictive server 14 as necessary either directly or via the police client 24 and providing a visual display will suffice, where the visual display is either a part of the user device or a separate unit. In addition, the user device 54 contemplates using multiple devices for communicating in the field information and data while displaying on a separate visual display unit. As an example, patrol units may communicate with the police client 24 using handheld radios while receiving displays on the in vehicle on screen display system. Both wired and wireless communications and a combination thereof are contemplated. In general, the user device 54 may be used for requesting the crime reports (predictive or other means) from the data center 12 and may be located at a patrol station in a fixed location or in a portable unit that travels with one or more patrol officers out in the field, either in a police vehicle or carried by the patrol officer. In addition to the foregoing, a mobile app may be used in the user device 54 to facilitate the process and user displays described herein. As an alternative, the mobile app may send GPS data directly (or indirectly via an intermediate server) to the prediction server 14 instead of providing data to a police client 24 which is then, in turn, transferred to the prediction server 14.

Figure 2:
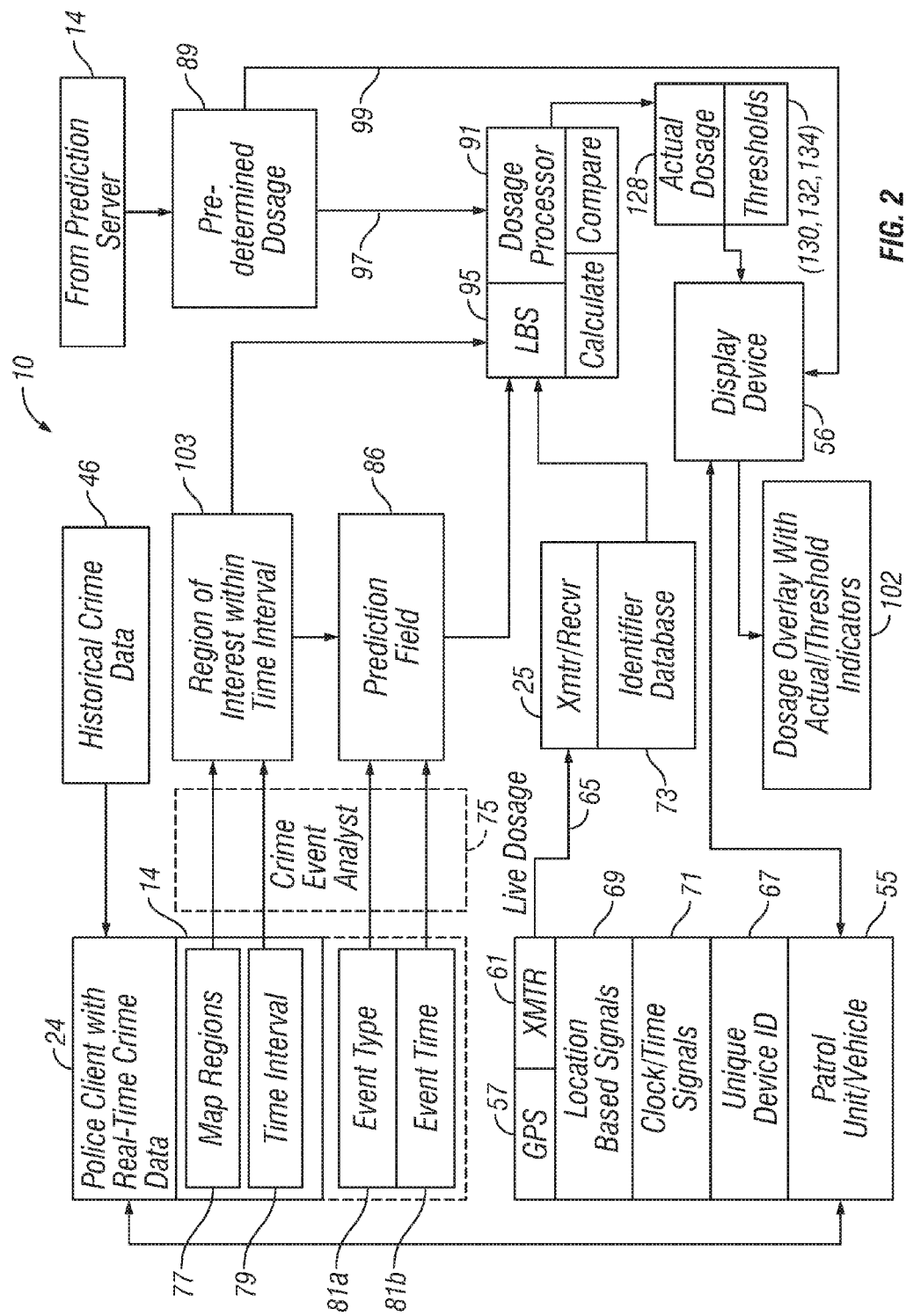
FIG. 2 is a block diagram expanding on the system architecture of FIG. 1 and illustrating the data flow paths used by the patrol presence management system of FIG. 1 in accordance with the principles of the present invention.

Turning now to FIG. 2, an overview of the patrol presence management system 10 components and data flow are shown. There are two primary data flow options. The first is providing a prediction field (crime grid) 86 (as visually displayed as reference numeral 88 in FIG. 4) from the prediction field generator 14 with a dosage overlay 102. A crime grid will generally include a map element, and one or more hotspots, regions in which one or more crime events have occurred within a given time frame. The second data flow option is to provide a region of interest and time interval. A region of interest is simply a map element with or without reference to an event but associated with a time interval of interest. From the patrol officer or vehicle 55, input generated in the field may be transmitted from the transmitter 61 to the transmitter/receiver 25 of the police client server 24. The input, collectively termed the live dosage info 65 includes a unique identifier 67 particular to a patrol officer or vehicle or GPS device 57, a location based signal such as a GPS position or other geolocation data 69, and a timestamp 71 generated by a clock 59 (FIG. 1) associated with the GPS device, which may then be processed by the dosage processing unit 91 using a location-based services function 95 to determine the location of the patrol units associated with each GPS device and the time at one or more relayed locations. The live dosage info 65 may be submitted to an identifier database 73 associated with the predictive server 14, either directly using transmitter 61 or indirectly through a transmission to the transmitter/receiver 25 associated the police client 24, which in turn communicates with the predictive server. The identifier database 73 ensures the coded identity (unique ID) of the received dosage information 65 correlates to the identity of a trusted source by comparing the received unique ID 67 to known IDs stored in the database. Those unique IDs that are verified are used to calculate the dosage amounts described below. The identifier database may be the same as the database 26 storing the historical crime data 46 or distinct. This live dosage info 65 is typically provided by a patrol officer 55 in the field having a handheld device 54 or a patrol vehicle with GPS, identifier, and timestamp capabilities.

Figure 4:
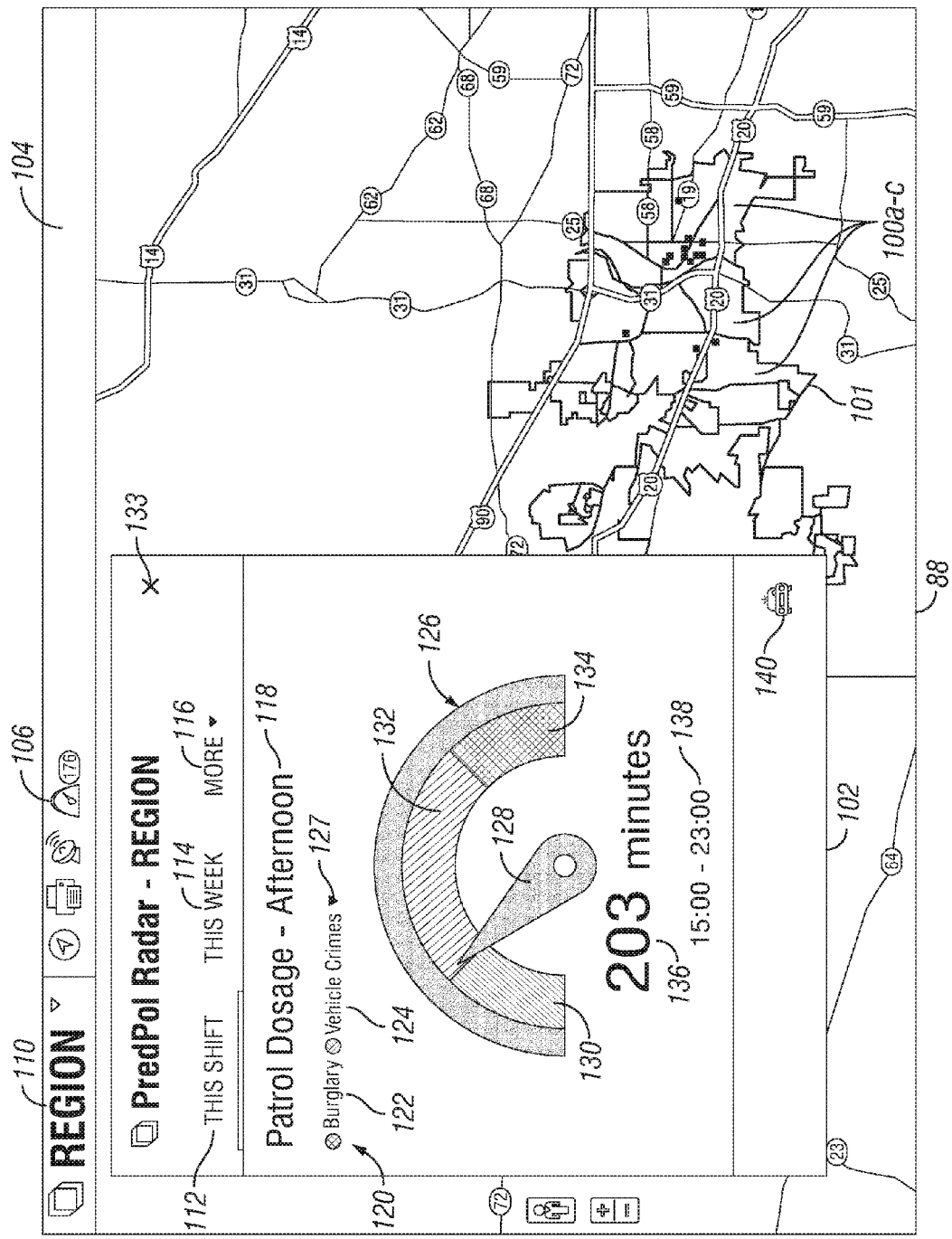
FIG. 4 is an exemplary user interface (map view with navbar and dosage meter overlay) that may be presented by the patrol presence management system of FIGS. 1-3.

Still referring to FIG. 2, other input for the predictive server 14 may include the historical crime data 46 that may be supplemented with real time crime data provided by one or more patrol officers 55 to the police client 24. This historical crime data and real time crime data input are fed into the prediction processor 42 (FIG. 1) of the prediction server 14 where it may further be processed by an optional crime event analyst 75. The resulting output generated by the prediction processor and/or crime event analyst provides three crime related outputs: map regions 77 or the grid, time windows or intervals 79, and crime events, that include crime type 81*a*, and time of occurrence 81*b*, the output collectively comprising the prediction grid or prediction field 86 with one or more hotspots 100*a-c*, if crime events have occurred within the map region. It will be understand that a time window or time interval may also refer to a specific time, as opposed to a range of time, in order to provide a snapshot at a specific time. More sophisticated technologies, such as that in U.S. Pat. No. 8,949,164 will add probabilities to each of the crime types within the grid for selected time intervals and rank the hotspots. It will be appreciated that the crime event analyst may be a real person or a programmed machine. These three prediction server outputs 77, 79, and 81*a*, 81*b* are combined to generate a visual crime grid 88 (FIG. 4) or prediction field that contains a geographic region wherein one or more criminal event types occurred at one or more times. Individual hotspots 100*a-c*, for example, or clusters of hotspots may be further delineated with a boundary 101 (FIG. 4). While a predictive server 14 is preferred for generating the prediction fields, it will be appreciated that the crime grid may be manually generated or a combination of programmed and manually generated as well. In another embodiment, the events or event types may be one of various crime events (e.g. theft, assault, etc. as exemplified below), traffic events, smuggling events or any event where a change of state may occur that is affected by a semi-randomly occurring change of state action.

As an alternative to generating a prediction field 86 resulting in a map element 77, time interval 79, and one or more crime events 81*a*, 8*b* with or without boundaries 101, the prediction server 14 may generate, either from manual entry or automatically, a region of interest 77 map along with a time interval 79 of interest to generate a map and time interval 103 (FIG. 2). Either the more advanced prediction field 86, which generally includes the map and time interval elements of output 103 along with hotspots (crime events 81*a*, 81*b* and boundaries 101) or the reduced display 103 may be provided to the dosage processor 91 as described below. In addition, such reduced display may be retrieved from other mapping sources and a time interval of interest selected for forwarding to the dosage processor.

Pre-Determined Dosage, Actual Dosage, and Related User Interface

Referring now to FIGS. 1-4, in addition to generating or providing the crime grid or prediction field 86 (as depicted as the visual crime grid 88 on the display device 56) or the region of interest and time interval 103, the prediction processor 42 of the prediction server 14 may further be programmed to generate or provide a pre-determined dosage 89, which is in turn provided to a dosage processor 91. The pre-determined (or pre-calculated) dosage is used to establish the threshold regions 130, 132, 134 of the dosage meter 126 (FIG. 4) below for comparison purposes whereas the actual dosage needle 128 indicates the actual (live) or current dosage, which is practically real-time, with the understanding of potential lag time for processing and transmitting. The live dosage is an accumulated, aggregated, or tallied dosage over a selected time interval within a given hotspot or spatial region and thus may be for live (also referred to as real-time, actual, or current) dosage or a historical dosage, such as when selecting a prior time interval for analysis. The pre-determined dosage 89 may be algorithmically determined, either by a computing device or manually or selected for comparison purposes against the GPS data. The pre-determined dosage may originate from one or more sources, including: (1) from an auto-processing process as generated by the prediction engine either algorithmically or by a default value, or (2) may be manually determined or (3) based on best practices known in the art or (4) minimum amounts or maximum amounts based on historical findings or manual input. As explained herein, the pre-determined dosage generally provides a baseline, ideal, or preferred comparator to the actual dosage.

In this exemplary embodiment, the specific dosage threshold calculations 130, 132, 134 (FIG. 4) are generated as follows. As an initial matter, the odometer 126 (FIG. 4) shows the actual dosage or time spent in the prediction boxes 100*a-c* as indicated by the dosage needle 128 and dosage time 136. In this exemplary embodiment, the maximum allowable dosage is 20% of the maximum number of hours that could be dosed by all cars currently in the shift, that is, the maximum dosage is the number of vehicles multiplied by the number shift hours multiplied by 0.2 (or 20%). To calculate the number of vehicles, a thirty day period is used as the time interval. For each day in the thirty day period, the number of vehicles is counted for each day for each shift that generated a dosage. The total dosage is calculated for each individual vehicle. Vehicles in the vehicle count that has had dosage for less than 5% of the dosage total of the vehicle that had the most dosage are not counted. The total vehicle counts for the thirty days are added up and divided by thirty. This results in an average number of vehicles per day per shift. The shift calculation is the number of hours between shift start time and shift end time. This approach may be used to take into account the number of actual resources (patrol units 55) out in the field which may vary from day to day and shift to shift or other selected time interval.

An alternative method of calculation for the pre-determined dosage 89 may be to calculate the total time based on the number of hotspots or prediction boxes 100*a-c* independent of the number of patrol units 55 out in the field. An exemplary calculation for that scenario may be defined by using shift time multiplied by the number of boxes in the shift to obtain the total dosage time available. Then, a percentage of that result may be used to determine the pre-determined dosage with subsets of that calculation being used to establish one or more thresholds 130, 132, 134 for comparison to the actual dosage as indicated by the dosage needle 128. Either calculation may be used to determine an ideal dosage.

With the maximum odometer dosage calculated, this is visually represented by the far end of the cross-hatched section 134 (FIG. 4), indicated with the color yellow in use, and this provides the overall range of the dosage meter from zero to this calculated maximum. In addition, in this exemplary embodiment, the right leaning lined region 130 represents a pre-determined dosage threshold of less than 5% of the total shift time in minutes indicated in the color red in use, the left leaning lined region 132, indicated in the color green in use, represents a pre-determined dosage threshold of 5-15% of the total shift time in minutes, and the cross-hatched region 134 represents a pre-determined dosage threshold of 16-20% (the pre-determined cap) of the total shift time in minutes. These ranges are generally accepted for best practices as the odometer displays the amount of time in box, and at some point more time is not necessarily better. At below 5%, for example, it has been found that police presence has a lower deterrent effect while, above 15%, it has also been found that the police presence gains diminishing returns on their time in the box and are then better off patrolling other areas of the city. This is supported by thinking in terms of the extremes as well. For example, if the patrol spends 100% of their time in hotspots (selected geographic regions or boxes), the rest of the city remains unpatrolled. In all likelihood, a 100% occurrence of a particular crime does not happen within a single hotspot. It will be appreciated that these dosage thresholds are not meant to be limiting in any manner, may vary from location to location, and each precinct or jurisdiction or selected region may determine satisfactory thresholds tailored to their own situation. In addition, the dosage thresholds may be per crime type or for an aggregate crime set.

In this exemplary embodiment, the pre-determined dosage 89 may be used to establish dosage thresholds 130, 132, 134, equivalent to less than 5%, 5-15%, and 15-20%, respectively, although this is not meant to be limiting in any manner. Pre-determined dosage may include one or more amounts or percentages. Historical GPS and timestamp data may also be used to generate pre-determined dosages as estimates of preferred or actual dosages and for comparison purposes to the current dosage as indicated by the needle 128. The pre-determined dosage may be determined for each prediction region for a prediction period based on one more event types (crimes) or region of interest and vary from location to location and/or by crime event or time interval. It will be appreciated that the pre-determined dosage 89 may be provided as an input to the dosage processing unit 91 as shown by flow path 97 (FIG. 2) for further processing and/or comparison purposes with the actual dosage 128 or provided as an input as shown by flow path 99 to a display generating function within the display device 56 for building the corresponding odometer portion of the graphical user interface 102.

Figure 3:
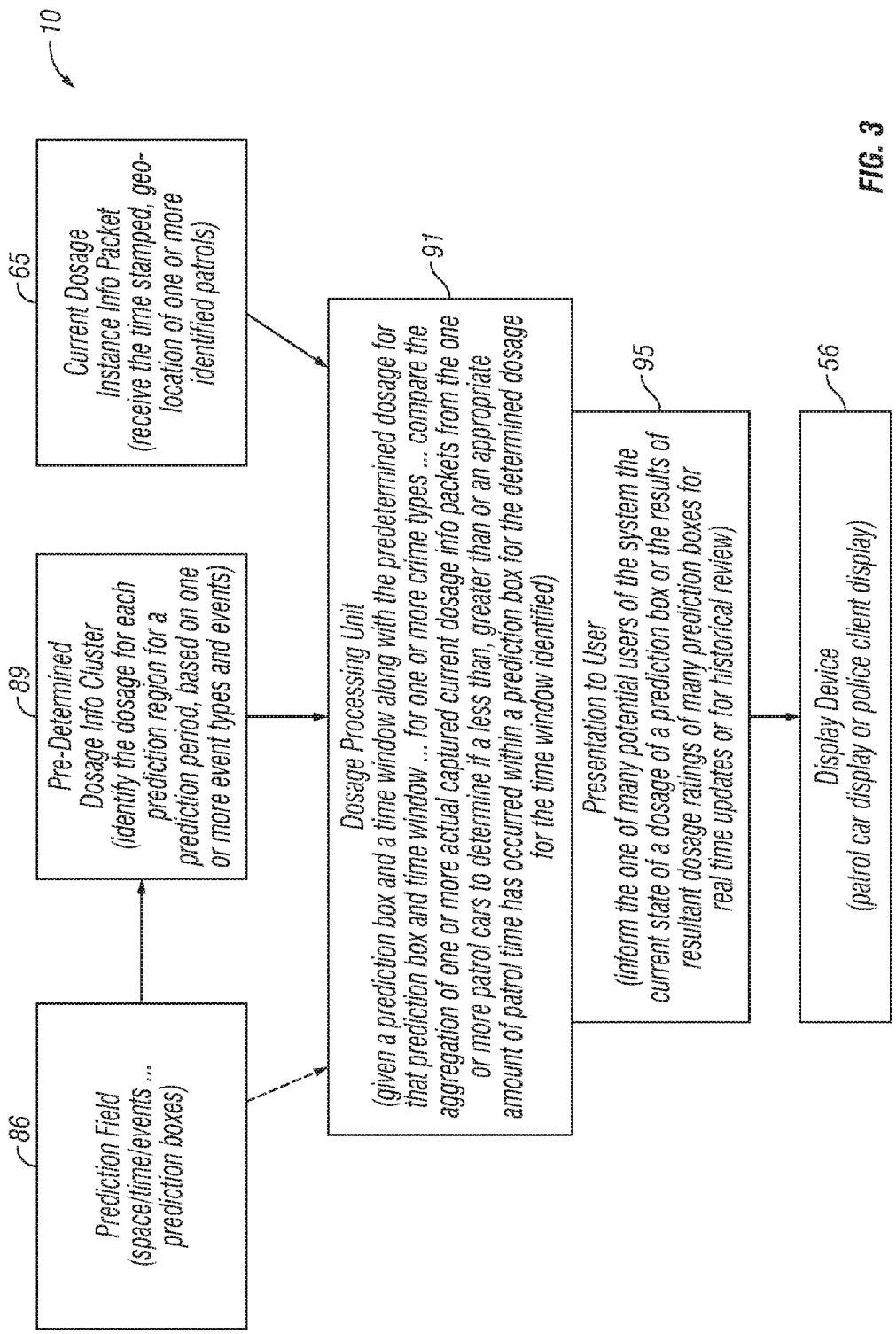
FIG. 3 is a process diagram for use with the patrol presence management system of FIGS. 1-2.

Still referring to FIGS. 2 and 4, with the pre-determined dosage 89 calculated or otherwise provided if being used, the dosage processor 91 may also access the live dosage info 65 from the identifier database 73 to generate or provide a live, actual, or current dosage or historical dosage, depending on the data source, for a prior time interval. For those GPS codes 67 verified by the identifier database 73, the dosage processor 91 may use its location based services function 95 to track patrol units 55 locations and associated time spent at each location as updated by the patrol units. The dosage processor 91 may be programmed to calculate or generate a current dosage amount based on the live dosage info 65, with or without ongoing supplementation or updates, and may also compare it to various dosage thresholds 130, 132, 134 of the pre-determined dosage 89 if used. The resulting actual dosage 128 with or without the dosage threshold 130, 132, 134 data may then be transmitted to the police client 24 and forwarded to or accessed by the patrol officer 55 for visual presentation on a display device 56 as shown in FIG. 4, for example. The display data 128 may also be forwarded directly to a display unit 56 associated with the patrol officer 55 instead of relaying through the police client 24. Referring now to FIG. 3, an exemplary process for generating dosage related data as indicated by needle 128 (FIG. 4) and related user interface 56 is provided. As an initial step, the prediction field or grid 86 may be generated using the prediction server 14. The prediction field includes spatial, time interval, crime times, and crime event data displayed in the form of prediction boxes or hotspots 100*a-c* (FIG. 4) with boundaries 101 on a map element 88. As described above, a pre-determined dosage info cluster 89 is generated for each prediction field for a prediction period (time interval), based on one or more types and events (crime types). This establishes the dosage thresholds 130, 32, 134 used for comparison purposes. In another embodiment, a region of interest and time interval 103 (FIG. 2) may be provided in place of the prediction grid 86.

Figure 5:
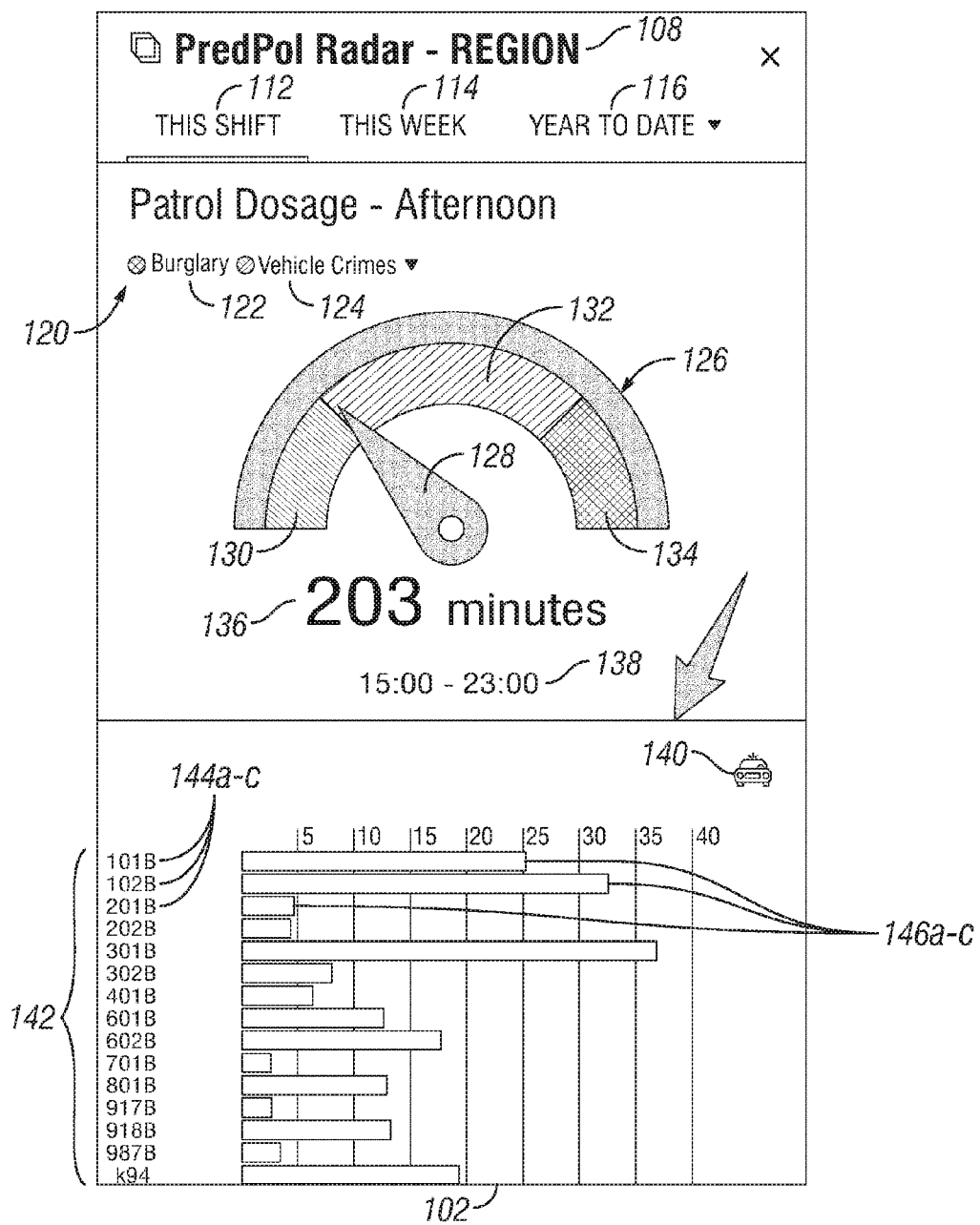
FIG. 5 is an exemplary user interface (expanded dosage meter overlay view) that may be presented by the patrol presence management system of FIGS. 1-3.
Figure 6:
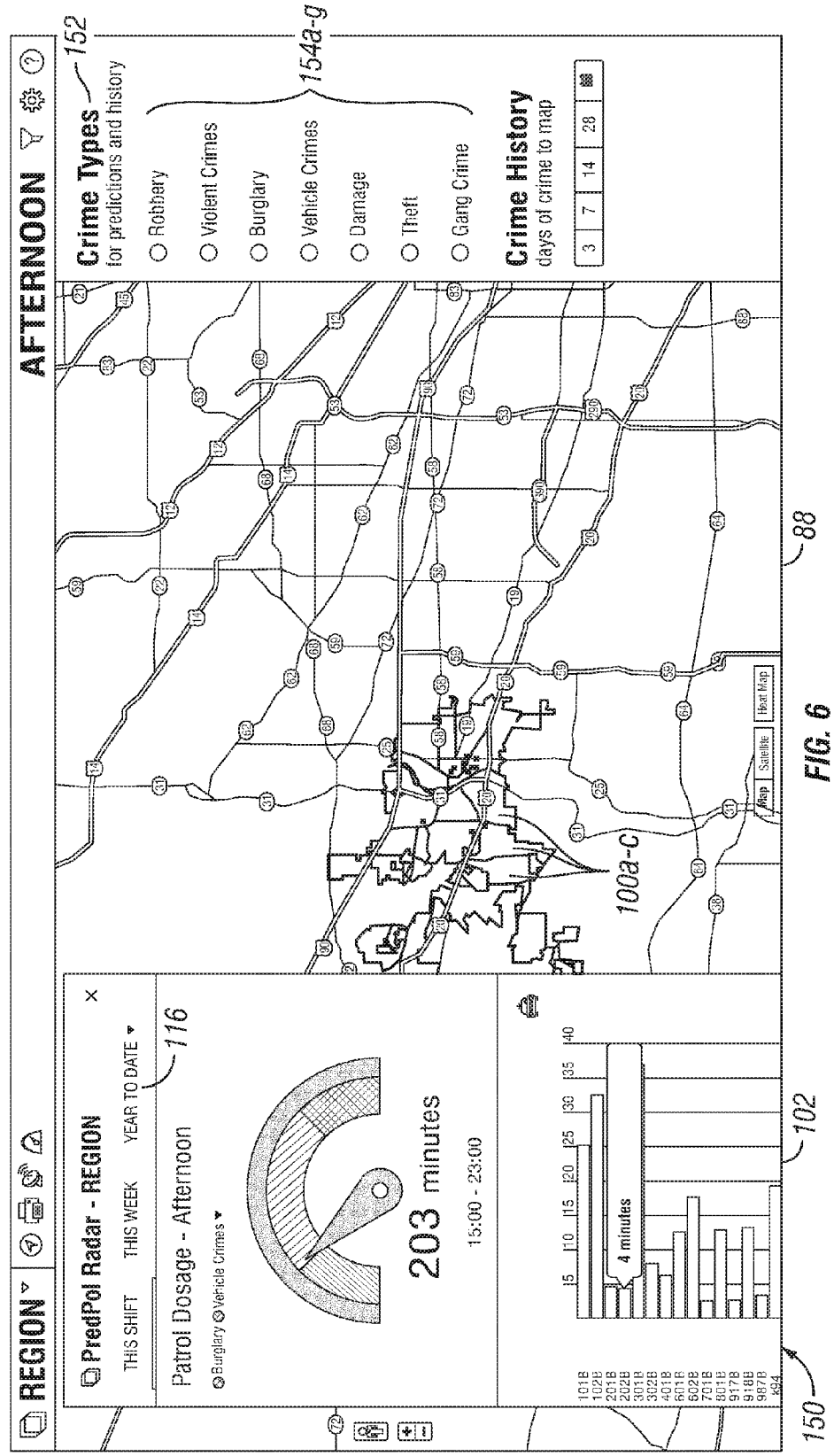
FIG. 6 is an exemplary user interface (detail view) depicting a map with dosage meter overlay and crime type menu that may be presented by the patrol presence management system of FIGS. 1-3.

Continuing on with FIG. 3, the current dosage instance info cluster 65 (live dosage info) is provided by the patrol officer or vehicle 55 in the form of a time stamped, geolocation or location based signal 69 for one or more identified patrols having a user device 54 such as a GPS unit 57 with a unique ID 67. If provided, the dosage processing unit 91 may then process the data associated with the prediction field 86, the pre-determined dosage info cluster 89, and the current dosage instance info packet 65 to determine a current dosage amount 128 (FIG. 4). For the GPS data and time data provided, the dosage processing unit 91 is programmed to provide location-based services functionality in relation to units of time. The dosage processing unit 91 then compares the current dosage amount 128 to the pre-determined threshold (dosage) data 130, 132, 134, which may be used to generate a dosage meter display 102 (FIG. 4) indicative of the calculated dosage amount relative to the thresholds 130, 132, 134 on the display device 56, available to the patrol commander or in the field patrol officers. The results are displayed on the user display 56 in the form of a dosage meter 102 (FIGS. 4-6). The user display 56 is preferably available to both the patrol officer 55 in the patrol vehicle or on a handheld device, and the police client display device 24 as well. In addition, an audio version of the current dosage versus the threshold may be communicated to the patrol officer via an audio device such as a headset, intercom, walkie-talkie, or police radio. It will be appreciated that current dosage amount as indicated by the needle 128 is the cumulative (aggregate) dosage relative to a selected subset of time or time interval within a selected region. Thus, current dosage may either be real-time, with the provision for processing and transmission lags, or historical, such as when looking up the dosage for a prior shift. Turning now to FIG. 4, a main toolbar 104 or navbar available on the primary user interface screen 56 of the patrol presence management system 10 includes an icon 106 in the shape of a miniature dosage meter. Selection of this icon 106 using conventional navigational techniques results in the dosage meter display 102 as a popup. The popup overlays the prediction grid map 88 (FIG. 4) and has several features. At the top of the dosage meter display or dosage panel is the city or region identifier 108 (FIG. 5) indicating the currently selected region, such as a parking space, city block, neighborhood, city or other defined region. Other regions may be selected by using a dropdown region menu 110 on the navbar 104. The region identifier is positioned above three dosage time interval selectors: This Shift 112, This Week 114, and More 116, a dropdown menu allowing for more customized time intervals via a calendar popup. This allows the user to select how many days to map for crime events in establishing the prediction boxes. In another embodiment the time interval may be in minutes, hours, months, years, etc. This More interval selector is labelled Year To Date in FIGS. 5-6 and provides the same function. Below the time interval selectors is a shift indicator 118 corresponding with the selected interval selector. In this exemplary embodiment, the time interval selected is the current (this) shift, which is the afternoon. Below the shift indicator is a crime type listing and legend 120. In this exemplary embodiment, the crime types includes burglary indicator 122 and a vehicle crimes indicator 124, which includes a drop down button 127 to bring up additional crime types for selection or allow the user to bring up additional crimes via the expanded interface 152 of FIG. 6 as described below.

Still referring to FIG. 4, the dosage meter display 102 includes a dosage meter, generally designated 126, that includes a needle element 128, indicative of actual (live, current, or historical) dosage relative to the selected time interval 138 similar to an odometer readout in shape. Instead of the current speed, however, the needle 128 may point to one of three regions (thresholds) on the dosage meter and change accordingly as the underling calculations vary. The first or leftmost region 130 indicated by right leaning lines may be colored red, or otherwise distinguished from adjacent regions, and is indicative that the calculated dosage is below the recommended threshold for the selected region. The red color is a warning that more time is needed by the patrol car within the selected region. The second or middle region 132 indicated by left leaning lines may be colored green, or otherwise distinguished from adjacent regions, and is indicative of the calculated dosage falling within the recommended threshold for the selected region. The green color is an affirmation that the allotted time within the region of interest is within standards set by the police department. The third or rightmost region 134 indicated by cross-hatching may be colored yellow, or otherwise distinguished from adjacent regions, and is indicative of a calculated dosage exceeding the recommended threshold for the region. The yellow color is a caution that the additional time should be spent elsewhere as the law of diminishing returns applies. In another embodiment, the number of regions may be other than three, e.g. one, two, four, five or more depending upon the number of threshold segmentations sought for the particular dosage objectives.

Should the needle 128 (indicative of the current dosage calculation) extend beyond a 180 degree arc, such as when the dosage goes above the 20% maximum cutoff, a rollover-popup or other visual indication may be used to determine how much over the recommended or selected maximum the current dosage is reading. It should be noted that the cutoff values between any two threshold conditions can vary. As an example when the dosage goes above the maximum cutoff, that cutoff may be 10%, 15%, 25% or other value. In a similar manner, the minimum threshold may be of one or more potential percent values. In another embodiment the cutoff values may not be a percent, but an absolute value or a programmatic value.

Still referring to FIG. 4, beneath the dosage meter 126 is the current dosage time 136 in minutes set above a shift interval 138. In this exemplary embodiment, the shift interval for an eight hour (480 minutes) afternoon shift is 3 pm to 11 pm. The current displayed dosage is two hundred and three (203) minutes and the needle 128 indicates that the current dosage is within the preferred green dosage threshold section 132. A close button 133 is located in the upper right hand section of the dosage display 102 so the user may close the popup display to view the underlying predictive crime grid 88 and hotspots 100*a-c*. In another embodiment alternate choices of shifts or multiple shifts may be presented.

In general, the current dosage numbers as indicated by the needle 128 update every 1 minute on the client side, that is, those visible to the patrol units 55. The server-side dosage script is a chronological job that runs every 5 minutes. Other suitable time intervals may be used. This script imports GPS location data 69 (FIG. 2) from the user devices 56 and calculates new box dosages based on the new locations. The server updates every 5 minutes or some amount of time intervals with the new retrieved data. The client device will survey the server 14 at a faster rate (e.g. every one minute). This way the client will always have retrieved the most recent data from the server.

In another embodiment, the needle 128 itself may be a narrow needle or a needle of some width or thickness, with the width or thickness indicating supplemental information, such as how much of the dosage was performed in a recent amount of time or how much geo coverage occurred in an identified time period. In another embodiment, the needle itself may have some indicating information, such as a color coding, which may relate to whether the current dosage occurred in a recent amount of time (e.g. shade of green) or a more distant past time period (e.g. shade of blue). Scrolling or hovering over the needle or odometer regions may yield additional details as well. In addition, the user interface may be modified to indicate how well the actual dosage 128 is distributed among the hotspots 100a-c. For example, one or more graphic features may be inserted into the user interface (geo display) as, for example, varying the line thickness of hotspot boundary outlines, shading hotspots, or using color indicators to indicate different levels of dosage coverage or distribution.

For updating the current dosage as indicated by needle 128 (FIG. 4), a background updating script or job may be used as follows. The dosage calculation procedure or job scans through GPS location data 69 from all transmitting in-vehicle Automatic Vehicle Location (AVL) systems or obtains GPS location data from the iOS application of the user device and measures how long the GPS reports being inside each hotspot or prediction box 100a-c (FIG. 4). On startup, the job finds the date range needed to cover all unprocessed locations. The start date is always the day before the first location, in case any of the morning locations actually happened in the previous day's night shift. The last date is the date of the most recently received location in the database.

The first time the dosage calculation job is run, the process starts with the first location in the database 26 or other database, such as the identifier database 73, where the GPS data 69, timestamps 71, and unique IDs 67 are stored. After each run, it stores the ID of the last location processed. The next time the dosage calculation process runs, the process starts with the location after the last one processed. This is important for incremental processing throughout the day, since the job runs every five minutes in this exemplary embodiment. To recalculate dosages, the dosages may be rolled back to a prior location ID in the admin user interface.

The dosage calculation job runs dosage calculations separately for each day. For each day, the process calculates dosages separately for each prediction vector (set of crime types). Each vector can have multiple maps, one for each shift. Each map has one set of prediction boxes 100a-c, typically about eight, although this is not meant to be limiting in any manner. For each prediction box, the dosage calculation job queries a locations table within the database 26 to see if any GPS coordinates exist inside the prediction box for that day. For efficiency in a first pass, the dosage calculation job only uses a count, and does not load any actual location data. If the dosage calculation process finds no GPS locations inside that prediction box's boundaries, the dosage calculation job moves on to the next prediction box.

On the other hand, if the dosage calculation job does find crime locations inside the currently analyzed prediction box or region of interest, the dosage calculation job widens the search area to a neighboring area of a one-box radius around the box (in this example, a 3×3 grid with the prediction box in the center) and loads all GPS points in that wider area for all of those in-and-around GPS locations. The size of the search grid is configurable, so it's easy to widen to a 5×5 grid or larger, if necessary. In another embodiment, the radius does not need to include contiguous boxes, but alternate or specific identified boxes as the calculation size widens. In another embodiment, boxes that meet a certain threshold in dosage, location or other attributes may be the boxes included as the calculation size widens.

The dosage calculation job then sorts all GPS locations by timestamp and groups them by vehicle or group of vehicles. For each vehicle, it traces each GPS location point as the vehicle moves in and out of the box boundary. Every time a vehicle moves out of a box, the job creates a dosage row in the database 26 that records how many seconds elapsed between the entry and exit points.

If the time between two consecutive locations is greater than some maximum time span (defaults to one hour for example), that location may be treated as an anomaly and an assumption is made that a previous exit from the box (e.g. it landed outside the selected 3×3 search area) was missed. This anomaly timeout may be adjusted as the user deems fit with the anticipation that a longer timeout will pull in more locations per box and increase the runtime of the database queries and calculations. For example, if there are locations for a particular vehicle inside the currently analyzed prediction box at 8:00, 8:15, and 8:27 pm, then much later (which may be due to an interruption in the GPS stream) outside the box at 10:45, it will be assumed that the vehicle left much earlier, and the most recent inside point of 8:27 pm will be used. Thus, the duration for that run will be calculated as 27 minutes.

For additional efficiencies, the queries for hit counts inside a box may be cached, and also the final calculated dosages of that box to cut down on massively duplicate database queries. This approach greatly speeds up the job and reduces performance degrading database access.

At end of each day, the last location dosage setting may be updated, the cache reset, and the dosage calculations may be restarted for the next day. By default, the dosage calculation job only calculates for a default prediction vector (crime type). This ensures that dosages are always available for a fresh page reload. More custom vectors, typically for shift-based missions, may be added.

In addition, given the large amount of data, there may be situations where there is a large backlog of initial locations to process. In that case, the dosage calculation job may be programmed to bail out after a maximum number of days by changing a bailout setting.

With reference now to FIGS. 4-5, at the bottom of the dosage popup 102 is a source icon 140. In this example, the source icon is a vehicle image. Selecting this source icon expands the dosage popup 102 into a source breakout section 142 (FIG. 5) for displaying device specific dosages. The patrol presence management system 10 may accept GPS information from a user device 56 either manually or automatically. This GPS information generally includes information that identifies the input device source, the geo-spatial location of the source and the timestamp of the geo-spatial location of the input device source. The input device source could include a device ID 144a-c. While the dosage meter 126 (FIG. 4) is an aggregate dosage number for all vehicles or patrol officers/units in a shift, by selecting the patrol car or source icon 140, the user may view the dosages that are specific to each GPS input device given that a device ID is provided. The GPS input device may be a patrol car, a radio, a mobile application, or other suitable geolocation provider.

This device ID 67 from all acceptable input device sources may be maintained in a database 26 (FIG. 1) or identifier database 73 (FIG. 2), so when the system 10 receives input of the specific device ID, it may be referenced in the database of acceptable device IDs to insure proper tracking of acceptable devices. Device IDs are then correlated to the item that is being tracked for dosaging purposes. In this automated manner there is an authentication subsystem to insure the device ID is an acceptable device ID. The GPS information from a device may also be entered into the dosage system 10 manually.

Still referring to FIG. 5, the source breakout section 142 list one or more sources 144*a-c* in rows, typically device names or other identifiers, including names, for each of the patrol cars or patrol officers, and their associated specific dosage information 146*a-c*, respectively, in the form of a time bar indicative of the dosage level relative to the selected prediction boxes 100*a-c* or hotspots (FIG. 4). Hovering over an individual time bar results in an enlarged text display listing the actual dosage. In this example and for the selected shift, patrol car 101B has spent roughly 25 minutes within the selected hotspot (or selected bounded region) during the selected time period, patrol car 102B has spent roughly 33 minutes within the selected hotspot, and patrol car 201B has spent roughly 5 minutes in the selected hotspot. This may apply to one or more crime event types or a combination of one or more crime event types. If these were the only three sources, then the cumulative dosage would be roughly 63 minutes in the hotspot for the selected shift. Each individual source 144*a-c* may also be selected to bring up an individual dosage meter pertaining to that source alone with a similar display to that shown in FIG. 4.

A further expanded display, generally designated 150, is illustrated in FIG. 6, is accessible when selecting the drop down button 127 (FIG. 4) on the dosage popup 102. As with the prior display in FIG. 4, the expanded display includes a mapping element 88 with prediction boxes 100*a-c* and the expanded dosage meter 102 of FIG. 5. In addition to the foregoing, the expanded display 150 includes a crime types selector section 152 with a set of crime types 154*a-6* to choose from using toggle buttons. Examples of crime types in this exemplary embodiment include robbery, violent crimes, burglary, vehicle crimes, damage, theft, and gang crime. Selecting a crime type adds the crime to the dosage popup 102. In this exemplary embodiment, burglary and violent crimes have been selected as indicated by the toggled buttons and listing on the dosage popup 102.

Exemplary Usage of the Dosage Monitoring and Display System:

In the preferred embodiments, many of the features of the patrol presence management system 10 may be executed using a series of user interfaces (screens, mobile device screens, displays, pages, or web pages) across the network 18 or a local area network. With reference now to FIGS. 1-5, an exemplary walkthrough for using the patrol presence management system 10 will now be described. It will be assumed that the user has registered with the system site and has a login ID. Although this is the preferred approach, first time and unregistered users are contemplated as well. Registering with a website or application is well known to those of ordinary skill in the art. After the registered user logs into the system application using an input device 62 in communication with the user device 54, the police presence management system 10 will present a main page such as that shown in FIG. 4. The user, such as a patrol unit 55 or watch commander may select the region of interest using the region dropdown 110 (FIG. 4). Once a region is selected, a corresponding visual crime grid 88 will then be displayed with a map element 77 as part of a prediction field 86 having one or more hotspots 100*a-c* for the selected region based on prediction field information 81*a*, 81*b* received from the prediction server 14 is being used. Otherwise, a manual region selection may be entered into the system to define a geographic region of interest.

In the background, a pre-determined dosage 89 is generated by the prediction server 14 (or other system 10 server) or provided for a select set of prediction boxes (bounded hotspots) associated with a set of crime types or region of interest for a selected time interval. A set of crime types is termed a mission. Dosages are associated with the mission the patrol staff 55 was expected to patrol for a given district and a given period of time, called a shift. The dosage panel 102 limits selection to only one mission at a time. The dosage for that mission may be visually displayed by selecting the odometer icon 106 on the navbar 104 at the top of the screen (FIG. 4). After selecting the odometer icon, the odometer popup 102 will display and overlay a portion of the map element 77 and the visual crime grid 88.

Still referring to FIG. 4, the dosage panel 102 displays the number of dosage minutes 136 since the current shift as indicated by the current shift indicator 118 and current shift interval 138 started. To select a different shift other than the default current shift, the user may select the This Week option 114 or more dropdown button 116 to select an alternative shift other than the current shift. If a shift other than the current shift is selected, the dosage panel 102 will display the dosage minutes 136 for the last time that selected shift occurred.

Time interval selectors 112, 114, on the dosage pop-up 102 allow selection of a number of predetermined time periods or, in the case of the More or Year to Date button 116, a calendar may be generated to allow the selection of any historical date range. This calendar feature also allows the selection of dates for which no dosage is generated.

Once the shift or time interval is selected, a dosage is calculated, generated, or provided and indicated by the needle 128 within the dosage panel 102. The location of the needle point within one of the three threshold regions: 130, 132, 134 (FIG. 4) provides an indication of the dosage relative to preferred thresholds as described above. Should the shift be the current one, the watch commander may contact one or more patrol units to order or recommend that additional time in the prediction box is required, or alternatively, that no additional time is needed based on the dosage setting. In addition, patrol units in the fields may request the dosage panel to determine if more or less time is needed in the prediction box on their own volition.

Referring now to FIGS. 5-6, the watch commander may also select the source icon 140 to bring up individual units instead of the aggregate dosage panel 102 (FIG. 4). This provides additional resource management by allowing the watch commander to selectively determine which units require additional time in the hotspots 100*a-c* or have spent too much time in the hotspots 100*a-c* based on their unique ID 144*a-c* and corresponding dosage time bars 146*a-c*.

Figure 7:
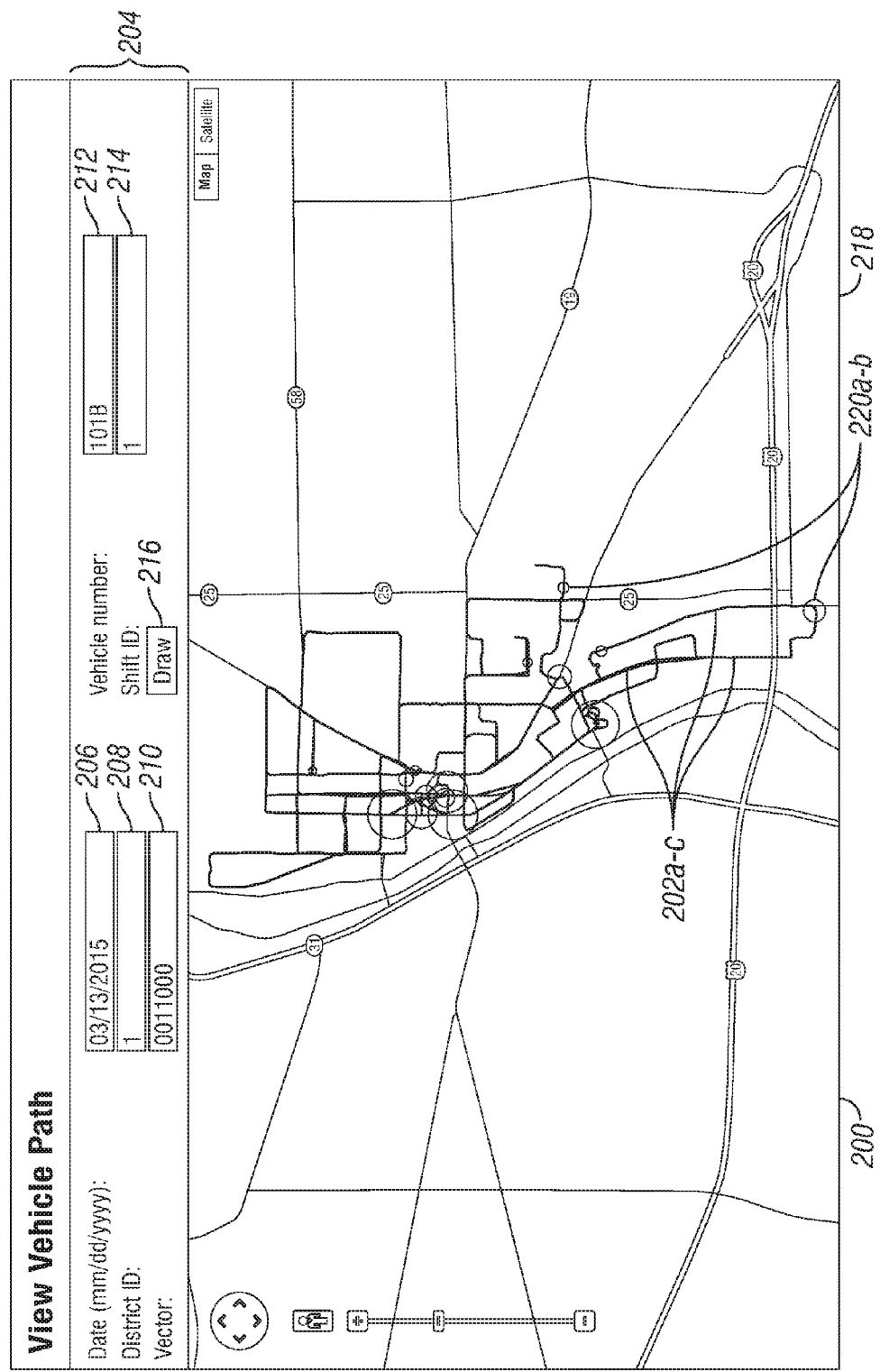
FIG. 7 is an exemplary user interface (vehicle path view) that may be presented by the patrol presence management system of FIGS. 1-3.
Figure 8:
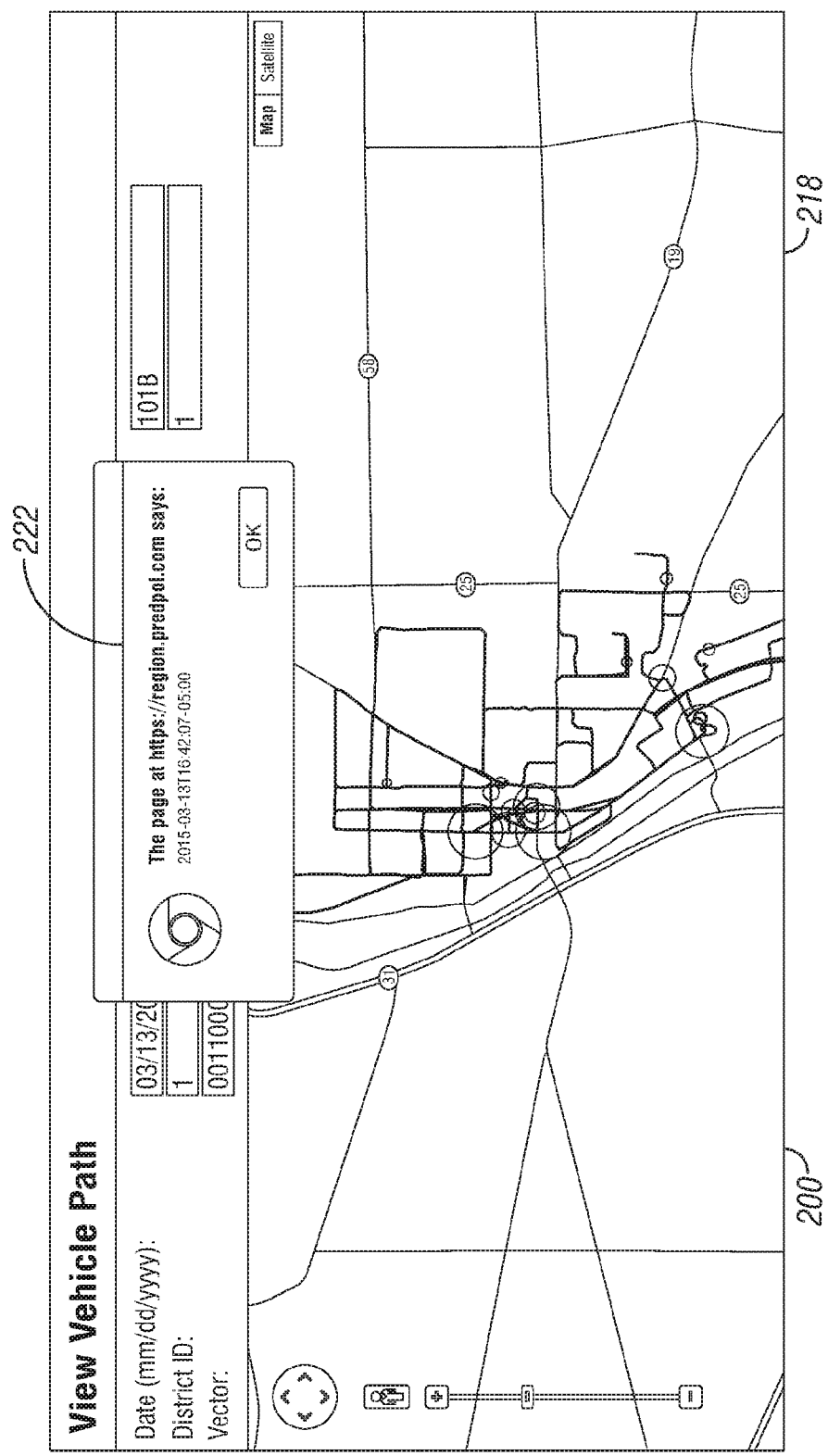
FIG. 8 is an exemplary user interface (vehicle path view) that may be presented by the patrol presence management system of FIGS. 1-3.

Turning now to FIGS. 2 and 7-9, there is an additional feature of the patrol presence management system 10 that displays the vehicle path as interpreted from the GPS data 69 received from the patrol units 55. As shown in FIG. 7, the vehicle path display, generally designated 200, includes a set of path lines 202*a-c* that indicate the path a selected GPS device 57 has taken over the day indicated. At the top of the vehicle path display is an information block 204 with data entry slots for the date 206, district ID 208, vector 210, which is a code for a crime type or a selection of multiple crime types, vehicle number 212, and shift ID 214. Once this data is input, the user may select a draw button 216 to generate the vehicle path lines 202a-c over a map display 218 representative of the selected district ID 208. Should the user select a point along a particular vehicle path by clicking on a point on the associated line, a time stamp 222 indicative of the time the associated GPS device was in this selected location will pop up on the user interface (FIG. 8).

Figure 9:
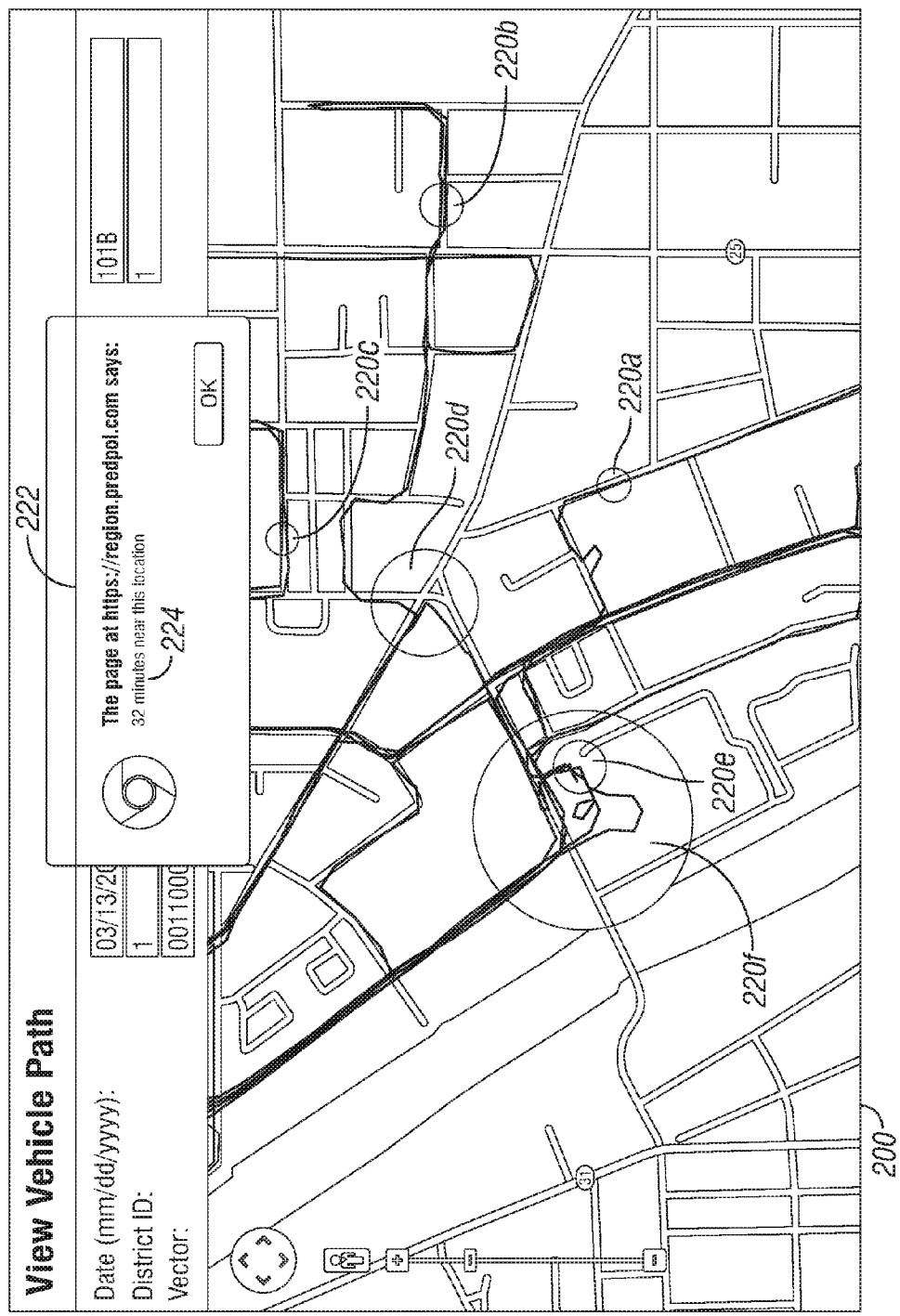
FIG. 9 is a close up of the view of the user interface of FIG. 8 that may be presented by the patrol presence management system of FIGS. 1-3.

In addition to the path lines 202a-c, one or more round circles, such as those shown at 220a-b for example in FIG. 7, generally indicate periods when the GPS device is stationary. The circles also represent the total time spent in or near a specific location as indicated by their relative sizes. If more detail is required, the user may click on a circle and see the total time spent in this selected spot (FIG. 9). For example, in FIG. 9, there are six circles 220a-f on the screen. Circle 220f is the largest and indicates the most stationary time for the associated GPS unit 57 (FIG. 2). The overall area may be enlarged. In addition, by clicking on or otherwise selecting the largest circle 220f, an overall time display 222 appears and shows the current amount of time 224 represented by the circle 220f. Other circles may be selected accordingly. Circle sizes may be capped for a selected time period such as 30 minutes and displayed in a different color to indicate the overall actual size would be larger if the ratio of size to minutes spent in area were maintained consistent to provide ease of viewing (FIG. 9). It is foreseeable that a patrol unit 55 may turn off its GPS unit 57. When there is no specific indication of whether a GPS unit has been turned off, to accommodate this scenario, a time interval between a first GPS reading from an active GPS unit relative to a second GPS reading from the same active GPS unit may be used to calculate the dosage. For example, if the time interval is within a selected threshold (e.g., an hour or other selected time interval) and both GPS readings indicate a location within the selected region, it may be assumed that the GPS unit was stationary within the selected region the entire time, regardless of whether the GPS unit was active the entire time. Alternatively, a GPS power signal may be provided to the prediction server 14 to indicate the status of the GPS unit 57 and taken into account for the dosage calculation such as making a determination to include the readings into the cumulative dosage or ignore them.

It will be appreciated that one or more micro-processing devices (or one or more servers) will suffice and be a workable alternative for storing and running the patrol presence management system 10. In other words, in a networked environment, the program modules and database may all be resident on a single web server, multiple servers, or portable devices, and accessible to one or more processors. Related to this, while the above-reference exemplary embodiment was described in terms of a client-server architecture, other suitable network architectures includes peer-to-peer and cloud computing types and mobile or portable devices for providing a network environment over which the patrol presence management system 10 may operate. In addition to being accessible over the network on a free or subscription basis, the patrol resource management program modules and/or database may be downloadable over a telecommunication network or loaded onto a portable digital storage device such as a hard drive, flash drive, optical disc, tape drive, or other conventional digital storage medium as a set or individually for implementation on a user's server or computing device system having the capability of running the program modules and/or database. In addition, the predictive server 14 may include the predictive processor 42 and/or dosage processor 91 or they may be one in the same or at different locations. The databases 26 and 73 may be distinct or one in the same as well.

While the solution discussed herein may reside primarily on the Web or mobile device app and the preferred embodiment described herein is structured in terms of handling this process over the Web, this is not meant to be limiting in any manner as local area and wide area networks, ranging from publicly accessible to internally managed private networks, may provide satisfactory solutions to incorporate and handle these crime prediction solutions. More specifically, the term WWW, Internet, Web, local area network (LAN), wide area network (WAN), and network should all be deemed interchangeable. In addition, these networks may either form a portion or the entirety of the telecommunication system for transmitting the crime data and prediction reports and may be used in conjunction with cellular, microwave, fiber optic, telephone, and satellite networks with both wired and wireless connections.

Summarizing the foregoing, the patrol presence management system 10 may comprise a first prediction field module (computer instructions or algorithm accessible by a processor unit), which establishes one or more prediction fields 86 where the prediction field is derived from a function of one or more events 81a, 81b occurring at one or more locations at one or more timed occurrences where the prediction field identifies spatial and temporal information where the spatial information defines a spatial region at a spatial location where the temporal information defines a temporal time window at a specific time element, a pre-determined dosage information cluster module, which establishes one or more pre-determined dosage information clusters 89 where the one or more pre-determined dosage information clusters comprises spatial information defining a spatial region at a spatial location where the one or more pre-determined dosage information clusters comprises one or more expected time functions where the one or more pre-determined dosage information clusters is associated with a first prediction field a current dosage instance information packet module, which captures one or more current dosage instance information packets 65 where a first current dosage instance information packet comprises a first current dosage instance information source identifier where a first current dosage instance information packet comprises spatial information defining a current spatial location associated with the first current dosage instance information source identifier where a first current dosage instance information packet comprises a current dosage instance time element associated with the first current dosage instance information source identifier where the one or more current dosage instance information packets is retrieved from a current dosage instance information source a dosage processing unit 91 where the dosage processing unit identifies a prediction field with a first pre-determined dosage information cluster associated with a first expected time function where the dosage processing unit correlates one or more current dosage instance information packets to a corresponding pre-determined dosage information cluster where the one or more current dosage instance information packets and the corresponding pre-determined dosage information cluster are associated with the identified prediction field where the correlation is determined to contribute to a dosage rating where the dosage rating is presented to a user. It will be appreciated that the prediction fields 86 may refer to both the prediction field output generated for display and also the prediction field module or list of computer instructions that generates such output. Likewise, the pre-determined dosage information cluster 89 may refer to both the pre-determined dosage output and also the pre-determined dosage information cluster module that generates that output. In addition, the current dosage instance information packet 65 may refer to the current dosage instance information output and also the current dosage instance information packet that produces that output.

In one aspect of this system, the pre-determined dosage information further comprises one or more expected activity occurrences.

The system also contemplates that an event is a crime event or an actionable event.

In using the system, a time window may be selected from one of an exact time, an hour or less, a group of hours, a day, a week, a month, a year, or year to date.

The system may also allow for a time element that is a time stamp or a time period.

The system further allows for a current dosage instance information source to be one of a manual source or an electronic transmittal source 57.

The system further allows for the one or more pre-determined dosage information clusters to be derived from a prediction field processing unit 14.

In addition to the system, methods of determining and presenting a dosage value are provided by presenting a graphic 126 where the graphic presents a below threshold region 130 where the below threshold region represents a dosage below a threshold, where the graphic presents an above threshold region 134 where the above threshold region represents a dosage above a threshold, where the graphic presents an in range threshold region 132 where the in range threshold region represents a dosage within a threshold presenting prediction field information, and where the prediction field information 88 includes a spatial area information component and a temporal information component.

The method may further comprise indicating a dosage below a threshold that correlates to a set of current dosage instance information packets 65 if a threshold correlating to a pre-determined dosage information cluster associated with a prediction filed is not met.

The method may further comprise indicating a dosage above a threshold correlates to a set of current dosage instance information packets 65 that exceeds a threshold correlating to a pre-determined dosage information cluster associated with a prediction field is exceeded.

The method may further entail indicating a dosage in range of upper and lower thresholds that correlate to a set of current dosage instance information packets 65 that are in range of the upper and lower thresholds correlating to a pre-determined dosage information cluster associated with a prediction field.

The method may further accommodate a set of prediction field information that includes event type information.

The method may further provide for presenting threshold information graphically.

The method may further provide for presenting the threshold information and correlated threshold data associated with the graphic.

Given the foregoing, the problem of measuring and displaying the time associated with a cumulative number of instances within a region of interest may be solved as follows: An activity monitor (patrol presence management) system comprising: (a) an input device constructed to generate location based signals; (b) an output device including a display element; and (c) a computational device in communication with the input and output devices, either directly or indirectly, the computational device having a processing unit and a memory for storing a dosage algorithm for determining the time associated with a cumulative number of instances with a selected region based on input from the input device, the algorithm configuring the computational device to: (i) receive input data from the input device, the input data including one more location based signals defining the selected region, an associated time element for each location based signal; (ii) for a selected region of interest during a selected time interval, determine if the location based signal is within the selected region of interest and, if so, determine if the location based signal occurred within the selected time interval to generate a dosage finding associated with the selected time interval; (iii) based on one or more dosage findings, accumulate the time elements of one or more dosage findings occurring within the time interval to generate a cumulative dosage amount; (iv) generate output data based on the cumulative dosage amount; and (iv) output the cumulative dosage amount to the output device for display by the display element, the cumulative dosage amount being representative of the total amount of time elements for all dosage findings occurring within the selected region of interest during the selected time interval.

Within the framework above, the input data may include at least one event type occurring within the spatial element during the time interval.

Within the framework above, the computational device may have access to a database with a pre-determined dosage set and the algorithm is further configured to compare the pre-determined dosage set to the accumulated dosage findings and generate corresponding output data.

Within the framework above, the input data may include at least one event occurring within the region during a current or prior time interval.

Another activity monitor (patrol presence management) system solution comprises: (a) a plurality of input devices constructed to generate location based signals, time stamps, and unique device IDs; (b) at least one output device including a display element; (c) a database for storing acceptable unique device IDs; and (d) a computational device in communication with the input and output devices, either directly or indirectly, the computational device having a processing unit and a memory for storing a dosage algorithm for determining the time associated with a cumulative time spent within a selected region based on input from one or more input devices having unique device IDs matching an acceptable unique device ID within the database, the algorithm configuring the computational device to; (i) receive input data from the input device, the input data including one more location based signals and an associated time element for each location based signal; (ii) generate a prediction field including a bounded region, a time interval, and one or more event types; (iii) generate one or more dosage thresholds; (iv) for the prediction field during a selected time interval, determine if one or more location based signals received from the plurality of input devices are within the prediction field and, if so, determine if the associated location based signals occurred within the selected time interval to generate a dosage finding associated with the selected time interval; (v) based on one or more dosage findings, accumulate the time elements of one or more dosage findings occurring within the time interval to generate a cumulative dosage amount; (vi) compare the cumulative dosage amount to the one or more dosage thresholds; (vii) generate output data the cumulative dosage amount relative to the one or more dosage thresholds; and (viii) output the cumulative dosage amount and dosage thresholds to the output device for display by the display element, the cumulative dosage amount being representative of the total amount of time elements for all dosage findings occurring within the selected region of interest during the selected time interval relative to the dosage thresholds.

In addition to the activity monitoring system, a representative method solution may be as follows: A method for measuring activity within a selected region on a computational device, the method comprising: (a) receiving location based signals at an input of the computational device from an input device constructed to generate one or more location based signals; (b) using an algorithm accessible by the computational device to determine if the location based signals fall within a selected region and, if so, using the algorithm to determine to total amount of time the location based signal is within the selected region; (c) accumulating the amount of time the location based signals are within the selected region during a selected time interval to calculate a dosage amount; and (d) outputting a display representative of the dosage amount.

Certain objects and advantages of the invention are described herein. Of course, it is to be understood that not necessarily all such objects or advantages may be achieved in accordance with any particular embodiment of the invention. Thus, for example, those skilled in the art will recognized that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure.

It is also contemplated that various combinations or sub-combinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above.

What is claimed is:

1. A patrol presence management system comprising:
    a crime prediction field module configured to generate at least one crime prediction field defining at least one hotspot associated with a region of interest and a time window, the at least one hotspot being derived from a plurality of crime events with each crime event having an associated crime type, an associated crime time, and an associated crime location occurring within the region of interest;
    a pre-determined dosage information cluster module configured to generate a maximum allowable dosage and one or more dosage thresholds relative to the maximum allowable dosage for the at least one hotspot;
    a current dosage instance information packet module configured to acquire one or more current dosage instance information packets, each packet including a source identifier, a location associated with the source identifier and within the region of interest, and a time element; and
    a dosage processing unit having access to the modules, the dosage processing unit being programmed to, in response to receiving the region of interest, at least one crime type, and at least one time window:
        generate the at least one crime prediction field using the crime prediction field module;
        establish the one or more dosage thresholds using the pre-determined dosage information cluster module; and
        for at least one selected hotspot, aggregate a current dosage using the current dosage instance information packet module based on each current dosage instance information packet having a location occurring within the selected hotspot and having a time element occurring within the time window; and
    an output device configured to display the at least one crime prediction field, the at least one crime type, the at least one time window, and the current dosage following receipt from the dosage processing unit.

2. The patrol presence management system of claim 1 wherein:
    the pre-determined dosage information cluster module derives at least one maximum allowable dosage for one or more hotspots by crime type.

3. The patrol presence management system of claim 1 wherein:
    the time window is an instance of time, a minute, an hour, group of hours, a day, a time of day, a week, a month, a year, or a year to date.

4. The patrol presence management system of claim 1 wherein:
    the source identifier is associated with a GPS unit, an AVL unit, or a manual entry.

5. The patrol presence management system of claim 4 wherein:
    the source identifier is unique to the source and is associated with a car, a radio, or a person with a mobile application.

6. The patrol presence management system of claim 1 wherein:
    the current dosage is independently derived from the maximum allowable dosage.

7. The patrol presence management system of claim 1 wherein:
    the current dosage is graphically represented in the crime prediction field by a proportionally sized boundary relative to the amount of time a source associated with the source identifier is at a specific location.

8. The patrol presence management system of claim 1 wherein:
    the time element is a time stamp or a time period.

9. The patrol presence management system of claim 1 wherein:
    the current dosage instance information packets are received from a manual input device or an electronic transmittal device.

10. The patrol presence management system of claim 1 wherein:

the one or more dosage thresholds are derived from a set of data used by the crime prediction field module.

11. The patrol presence management system of claim 1 wherein:
the output device is configured to display the one more dosage thresholds as a dosage threshold indicator and the current dosage is displayed as a current dosage indicator relative to the dosage threshold indicator.

12. The patrol presence management system of claim 11 wherein:
the dosage threshold indicator includes a first threshold region representing a dosage below a first pre-determined threshold, a second threshold region representing a dosage above a second pre-determined threshold, and an in range threshold region representing a dosage within the first and second pre-determined thresholds.

13. A method for managing patrol presence within a crime grid having one or more hotspots using a display device, the method comprising:
providing an input device constructed to transmit a set of input data including a region of interest, one or more hotspot selections, at least one crime type, and at least one time window;
providing a dosage display device constructed to display a set of graphical elements depicting a crime grid with one or more hotspots and at least one dosage display;
providing a database storing a plurality of crime events with each crime event having an associated crime type, an associated crime time, and an associated crime location occurring within the region of interest;
providing a memory storage device including a crime prediction module configured with a first set of instructions to generate the crime grid responsive to input from the input device including the region of interest and the time window, the crime grid defining at least one hotspot derived from the plurality of crime events stored in the database, the memory storage device further including a pre-determined dosage module configured with a second set of instructions to generate at least one preferred dosage threshold for the at least one hotspot, and the memory storage device further including current dosage module configured with a third set of instructions to acquire one or more location based signals from one or more remote wireless communication devices, each location based signal including a source identifier, a location associated with the source identifier and within the region of interest, and a time element;
providing a dosage processing unit operable to be placed in communication with the dosage display device, the input device, the database, and the memory storage device for executing the modules, the dosage processing unit further being operable to execute the sets of instructions in the modules to:
generate the crime grid with one or more hotspots by accessing the crime prediction module in response to receiving the region of interest, at least one crime type, and at least one time window from the input device;
establish at least one preferred dosage threshold for each hotspot by accessing the pre-determined dosage module;
acquiring location based signals from the one or more remote wireless communication devices by accessing the current dosage module;
receiving at least one selected hotspot from the input device;

within the at least one selected hotspot, aggregating a current dosage by accessing the current dosage module for the selected hotspot based on the location based signals having a location occurring within the selected hotspot and having a time element occurring within the time window;
transmitting the crime grid associated with the region of interest, the at least one crime type, and the at least one time window to the dosage display device along with the at least one preferred dosage threshold graphically represented as a preferred dosage threshold indicator and the current dosage being graphically represented by a dosage indicator relative to the dosage threshold indicator; and
issuing one or more commands to one or more wireless communication devices associated with the location based signals within the at least one selected hotspot to maintain or adjust the level of dosage within the at least one selected hotspot based on the dosage threshold indicator and the current dosage associated with at least one selected hotspot.

14. The method of managing a patrol presence of claim 13 wherein:
associating at least one preferred dosage threshold and at least one current dosage with at least one crime type; and
graphically representing at least one hotspot on the dosage display device by a boundary indicative of the current dosage.

15. A non-transitory, computer-readable medium with computer readable instructions stored thereon to be executed by a processing device operable to be placed in communication with at least one display device, at least one input device, and one or more remote wireless communication devices, the computer readable instructions directing the processing device to perform patrol presence management related operations using the at least one display device and the one or more wireless communication devices in response to receiving input including a region of interest, at least one crime type, and at least one time window from the input device by:
accessing a crime prediction field module stored on the computer readable medium and configured with a first set of computer readable instructions to generate at least one crime prediction field defining at least one hotspot associated with the region of interest and the time window received from the input device, the at least one hotspot being derived from a plurality of crime events with each crime event having an associated crime type, an associated crime time, and an associated crime location occurring within the region of interest;
accessing a pre-determined dosage information cluster module stored on the computer readable medium and configured with a second set of computer readable instructions to generate a maximum allowable dosage and at least one dosage threshold relative to the maximum allowable dosage for the at least one hotspot;
accessing a current dosage instance information packet module stored on the computer readable medium and configured with a third set of computer readable instructions to acquire one or more current dosage instance information packets from the one or more wireless communication devices in communication with the processing device, each current dosage instance information packet including a source identifier, a location associated with the source identifier and within the region of interest, and a time element;
receiving at least one hotspot selection from the at least one input device;
aggregating a current dosage using the current dosage instance information packet module for each selected hotspot within the region of interest based on each current dosage instance information packet having a location occurring within the selected hotspot and having a time element occurring within the time window, and;
for at least one hotspot selection, transmitting to the display device for graphical representation a plurality of graphic elements associated with the at least one hotspot selection, the graphic elements representing the maximum allowable dosage along with at least one dosage threshold indicator corresponding to the at least one dosage threshold, a current dosage indicator relative to the dosage threshold indicator and corresponding to the aggregated current dosage, the graphic elements further including the crime prediction field and the at least one hotspot selection defined by a boundary.

16. The computer-readable storage medium as set forth in claim 15 wherein the processor is further instructed to:
transmit one or more additional graphic elements representing a dosage instance information source identifier associated with the at least one selected hotspot to the display device for presentation.

17. The computer-readable storage medium as set forth in claim 15 wherein:
the at least one dosage threshold indicator includes a first graphic element indicative of a below threshold representing a dosage range below a first pre-determined threshold, a second graphic element indicative of an above threshold region representing a dosage range above a second pre-determined threshold, and a third graphic element indicating of an in range threshold region representing a dosage range within a prediction field, and;
the crime prediction field is depicted by a map display, a time window, one or more hotspots, and one or more crime type indicators.

18. The computer-readable storage medium as set forth in claim 17 wherein:
a current dosage indicator falling within the dosage range below the first pre-determined threshold correlates to a current dosage indicating that the current dosage should be increased to meet an acceptable threshold for at least one hotspot within the prediction field.

19. The computer-readable storage medium as set forth in claim 17 wherein:
a current dosage indicator falling within the dosage range above the second pre-determined threshold correlates to a current dosage indicating that the current dosage should be decreased to meet an acceptable threshold for at least one hotspot within the prediction field.

20. The computer-readable storage media as set forth in claim 17 wherein:
a current dosage indicator falling within the dosage range between the first and second pre-determined thresholds correlates to a current dosage that is in a preferred dosage range for at least one hotspot within the prediction field.

21. The patrol presence management system of claim 1 wherein:
the pre-determined dosage information cluster module is configured to generate a maximum allowable dosage and one or more dosage thresholds relative to the maximum allowable dosage for the at least one hotspot based on a percentage of the number of patrol units multiplied by a number of shift hours.

22. The patrol presence management system of claim 1 wherein:
the pre-determined dosage information cluster module is configured to generate a maximum allowable dosage and one or more dosage thresholds relative to the maximum allowable dosage for the at least one hotspot based on a number of shift hours multiplied by the number of hotspots within the crime prediction field.

23. A patrol presence management system, the system comprising:
an input device constructed to receive input including a region of interest, at least one selected hotspot within the region of interest, a time window, and a crime type;
a database storing a plurality of crime events with each crime event having an associated crime type, an associated crime time, and an associated crime location occurring within the region of interest and within the time window;
a dosage processing unit operable to be placed in communication with the input device, the database, and a memory storage device having:
a crime prediction module configured to generate at least one crime prediction field defining a plurality of hotspots associated with the region of interest and the time window, the hotspots being derived from the plurality of crime events stored in the database;
a preferred dosage module configured to generate a maximum allowable dosage and a set of preferred dosage thresholds relative to the maximum allowable dosage for each hotspot;
a current dosage module configured to monitor one or more physical locations of a plurality of remote source devices with unique source identifiers within the region of interest when placed in communication with the dosage processing unit and aggregate the amount of time each monitored remote source device spends at the one or more physical locations to generate a current dosage for each unique source identifier associated with each remote source device being monitored;
the dosage processing unit being programmed to, in response to receiving the region of interest, the crime type, and the time window from the input device:
access the crime prediction module to generate the crime prediction field with one or more hotspots;
access the preferred dosage module to establish the set of preferred dosage thresholds for at least one hotspot within in the crime prediction field as selected by the input device; and
access the current dosage module to aggregate a current dosage for at least one remote source within each hotspot selected by the input device and occurring within the time window; and
a dosage display device in communication with the dosage processing unit and configured to display the crime prediction field as a map, including at least one hotspot shown by an associated boundary within the map, the dosage display device further being configured to display the crime type, the time window, and alter the crime prediction field with a dosage display for at least one hotspot selected by the input device, the dosage display including the current dosage for at least one remote source compared to a set of preferred dosage thresholds including a maximum allowable dosage as calculated for each discrete selected hotspot following selection of the at least one hotspot provided by the input device.

24. The patrol presence management system of claim 23 wherein:
a dosage threshold cutoff is used to omit one or more low dosage occurrences from being used in calculating the maximum allowable dosage.

25. The patrol presence management system of claim 23 further including:
a network interface operable to be placed in communication with the dosage processing unit and at least one GPS enabled device providing a remote source with a unique source identifier associated with at least one patrol unit, the GPS enabled device constructed to relay the monitored location and one or more time elements for use in calculating the current dosage associated with the at least one patrol unit.

26. The patrol presence management system of claim 23 wherein:
the preferred dosage module is configured to generate the maximum allowable dosage based on a percentage of a number of patrol units multiplied by a number of shift hours for the at least one selected hotspot.

27. The patrol presence management system of claim 23 wherein:
the preferred dosage module is configured to generate the maximum allowable dosage based on a number of shift hours multiplied by a number of hotspots within the crime prediction field.

28. The method of managing a patrol presence of claim 13 further comprising:
instructing one or more patrol units to transfer from a first hotspot location indicated on the crime grid on the dosage display device wherein the current dosage exceeds a high dosage threshold to an alternative hotspot location indicated on the crime grid on the dosage display device wherein the current dosage is below a low dosage threshold.

29. The method of managing a patrol presence of claim 13 further comprising:
instructing one or more patrol units to remain in a first hotspot location indicated on the crime grid on the dosage display device wherein the current dosage remains below a low dosage threshold.

30. The method of managing a patrol presence of claim 13 comprising:
instructing one or more patrol units that no additional time is required to remain in a first hotspot location on the crime grid on the dosage display device wherein the current dosage is between a high preferred dosage threshold and a low preferred dosage threshold.

\* \* \* \* \*